United States Patent
Rugeland et al.

(10) Patent No.: US 12,279,324 B2
(45) Date of Patent: Apr. 15, 2025

(54) GRANULAR REQUEST FOR EARLY MEASUREMENT REPORTING

(71) Applicant: Telefonaktiebolaget LM Ericsson (publ), Stockholm (SE)

(72) Inventors: Patrik Rugeland, Stockholm (SE); Icaro Leonardo J. Da Silva, Solna (SE); Oumer Teyeb, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 690 days.

(21) Appl. No.: 17/608,403

(22) PCT Filed: May 4, 2020

(86) PCT No.: PCT/IB2020/054205
§ 371 (c)(1),
(2) Date: Nov. 2, 2021

(87) PCT Pub. No.: WO2020/222211
PCT Pub. Date: Nov. 5, 2020

(65) Prior Publication Data
US 2022/0312532 A1   Sep. 29, 2022

Related U.S. Application Data

(60) Provisional application No. 62/842,470, filed on May 2, 2019.

(51) Int. Cl.
*H04W 76/19* (2018.01)
*H04W 24/10* (2009.01)
*H04W 76/20* (2018.01)

(52) U.S. Cl.
CPC .......... *H04W 76/19* (2018.02); *H04W 24/10* (2013.01); *H04W 76/20* (2018.02)

(58) Field of Classification Search
CPC ....... H04W 8/24; H04W 76/19; H04W 24/10; H04W 76/20; H04W 76/15; H04W 76/30; Y02D 30/70
See application file for complete search history.

(56) References Cited

U.S. PATENT DOCUMENTS 11,228,934 B2 * 1/2022 Jin .................. H04W 76/27
11,356,879 B2 * 6/2022 Kim ................ H04W 76/27
(Continued)

FOREIGN PATENT DOCUMENTS

EP    2579641 A2    4/2013

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 15)," Technical Specification 23.401, Version 15.7.0, 3GPP Organizational Partners, Mar. 2019, 411 pages.

(Continued)

*Primary Examiner* — Brian T O'Connor
(74) *Attorney, Agent, or Firm* — Withrow & Terranova, PLLC

(57) ABSTRACT

Systems and methods are disclosed herein for enabling reporting of a subset of measurements performed by a wireless device when in an idle or inactive state to a cellular communications network. In one embodiment, a method performed by a wireless device for reporting measurements to a cellular communications network comprises performing measurements while in an idle or inactive state, storing the measurements, determining a subset of the measurements to be reported by the wireless device, and reporting the determined subset of the measurements to the cellular communications network. In this manner, only desired measure- (Continued)

ments can be reported, which reduces the amount of information that needs to be reported by the wireless device.

17 Claims, 13 Drawing Sheets

(56) References Cited

U.S. PATENT DOCUMENTS

| | | | | |
|---|---|---|---|---|
| 11,432,136 | B2* | 8/2022 | Wang | H04W 24/10 |
| 11,546,790 | B2* | 1/2023 | Jung | H04L 5/0094 |
| 11,805,437 | B2* | 10/2023 | Kim | H04W 76/27 |
| 11,991,703 | B2* | 5/2024 | Teyeb | H04W 76/30 |
| 2013/0072182 | A1* | 3/2013 | Jung | H04W 24/10 |
| | | | | 455/422.1 |
| 2022/0141697 | A1* | 5/2022 | Jin | H04W 76/27 |
| | | | | 370/329 |
| 2024/0032135 | A1* | 1/2024 | Cheng | H04W 76/15 |

OTHER PUBLICATIONS

Author Unknown, "Technical Specification Group Core Network and Terminals; Non-Access-Stratum (NAS) protocol for 5G System (5GS); Stage 3 (Release 16)," Technical Specification 24.501, Version 16.0.2, 3GPP Organizational Partners, Mar. 2019, 480 pages.
Author Unknown, "Technical Specification Group Services and System Aspects; Security architecture and procedures for 5G system (Release 15)," Technical Specification 33.501, Version 15.4.0, 3GPP Organizational Partners, Mar. 2019, 187 pages.
Author Unkown, "Technical Specification Group Radio Access Network; Evolved Universal Terrestrial Radio Access (E-UTRA); Requirements for support of radio resource management (Release 15)," Technical Specification 36.133, Version 15.5.0, 3GPP Organizational Partners, Dec. 2018, 3563 pages.
Author Unknown, "Technical Specification Group Radio Access Network; Evolved Universal Terrestrial Radio Access (E-UTRA); Requirements for support of radio resource management (Release 15)," Technical Specification 36.133, Version 15.6.0, 3GPP Organizational Partners, Mar. 2019, 3717 pages.
Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.5.0, 3GPP Organizational Partners, Mar. 2019, 131 pages.
Author Unkown, "Technical Specification Group Radio Access Network; Evolved Universal Terrestrial Radio Access (E-UTRA); Radio Resource Control (RRC); Protocol Specification (Release 15)," Technical Specification 36.331, Version 15.3.0, 3GPP Organizational Partners, Sep. 2018, 918 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.4.0, 3GPP Organizational Partners, Dec. 2018, 933 pages.
Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.5.1, 3GPP Organizational Partners, Apr. 2019, 948 pages.
Author Unknown, "Technical Specification Group Radio Access Network; NR; Physical layer procedures for control (Release 15)," Technical Specification 38.213, Version 15.5.0, 3GPP Organizational Partners, Mar. 2019, 104 pages.
Author Unknown, "Technical Specification Group Radio Access Network; NR; Medium Access Control (MAC) protocol specification (Release 15)," Technical Specification 38.321, Version 15.5.0, 3GPP Organizational Partners, Mar. 2019, 78 pages.
Author Unknown, "Technical Specification Group Radio Access Network; NR; Radio Resource Control (RRC) protocol specification (Release 15)," Technical Specification 38.331, Version 15.5.1, 3GPP Organizational Partners, Apr. 2019, 491 pages.
Ericsson, "R2-1910246: Granular early measurement request," Third Generation Partnership Project (3GPP), TSG-RAN WG2 #107, Aug. 26-30, 2019, 7 pages, Prague, Czech Republic.
Ericsson, et al., "R2-2003385: Granular reporting of early measurement results," Third Generation Partnership Project (3GPP), TSG-RAN WG2 #109bis-e, Apr. 20-30, 2020, 43 pages, Electronic Meeting.
Xiaomi Communications, "R2-1905732: Channel Quality Indication in Msg3," Third Generation Partnership Project (3GPP), TSG-RAN2 #106, May 13-17, 2019, 2 pages, Reno, USA.
ZTE Corporation, et al., "R2-1900670: Signalling procedure and measurement quantities for NR MDT," Third Generation Partnership Project (3GPP), TSG-RAN WG2 Meeting #105, Feb. 25-Mar. 1, 2019, 6 pages, Athens, Greece.
ZTE Corporation, et al., "R2-1900801: Early measurement reporting for RRC idle and inactive state," Third Generation Partnership Project (3GPP), TSG-RAN WG2 Meeting#105, Feb. 25-Mar. 1, 2019, 7 pages, Athens, Greece.
International Search Report and Written Opinion for International Patent Application No. PCT/IB2020/054205, mailed Jul. 15, 2020, 19 pages.

* cited by examiner

*Reproduction of Figure 5.3.13.1-1 of 3GPP TS 38.331*

Reproduction of Figure 6.2.3-1: MAC RAR

GRANULAR REQUEST FOR EARLY MEASUREMENT REPORTING

RELATED APPLICATIONS

This application is a 35 U.S.C. § 371 national phase filing of International Application No. PCT/IB2020/054205, filed May 4, 2020, which claims the benefit of provisional patent application Ser. No. 62/842,470, filed May 2, 2019, the disclosures of which are hereby incorporated herein by reference in their entireties.

TECHNICAL FIELD

The present disclosure relates to early measurement reporting in a cellular communications system.

BACKGROUND

1.1 Carrier Aggregation (CA) and Dual Connectivity (DC) in Long Term Evolution (LTE)

In Third Generation Partnership Project (3GPP) Release 10, CA was introduced in LTE to enable the User Equipment (UE) to transmit and/or receive information via multiple cells (so called Secondary Cells (SCell(s))) from multiple carrier frequencies to benefit from the existence of non-contiguous and contiguous carriers. In CA terminology, the Primary Cell (PCell) is the cell towards which the UE establishes the Radio Resource Control (RRC) connection or performs handover. In CA, cells are aggregated on the Medium Access Control (MAC) level. The MAC layer receives grants for a certain cell and multiplexes data from different bearers to one transport block being sent on that cell. Also, the MAC layer controls how that process is done. This is illustrated in FIG. 1.

SCells can be "added" (a.k.a. "configured") for the UE using RRC signaling (e.g., RRCConnectionReconfiguration), which takes in the order of hundreds of milliseconds. A cell which is configured for the UE becomes a "serving cell" for this UE. An SCell may also be associated with an SCell state. When configured/added via RRC, an SCell starts in deactivated state. In LTE Release 15, the enhanced or evolved Node B (eNB) can indicate to activate-upon-configuration, or change the state, at least in RRCReconfiguration, as shown below (from 3GPP Technical Specification (TS) 36.331 V15.3.0):

> 1> for each SCell configured for the UE other than the PSCell:
>    2> if the received RRCConnectionReconfiguration message includes sCellState for the SCell and indicates activated:
>       3> configure lower layers to consider the SCell to be in activated state;
>    2> else if the received RRCConnectionReconfiguration message includes sCellState for the SCell and indicates dormant:
>       3> configure lower layers to consider the SCell to be in dormant state;
>    2> else:
>       3> configure lower layers to consider the SCell to be in deactivated state;

In LTE Release 15, a new intermediate state between deactivated and activated state has been introduced for enhanced uplink operation. A MAC Control Element (CE) can be used to change the SCell state between the three states as shown in FIG. 2. There are also timers in MAC to move a cell between deactivated/activated/dormant. These timers are:

- an sCellHibernationTimer which moves the SCell from activated state to dormant state,
- an sCellDeactivationTimer, which moves the SCell from activated state to deactivated state, and
- a dormantSCellDeactivationTimer, which moves the SCell from dormant state to deactivated state.

The MAC level SCell activation takes in the order of 20-30 milliseconds (ms).

Once the network understands the need to configure and/or activate CA, the question is which cells to initially configure and/or activate, if they are configured, and/or whether a cell/carrier is good enough in terms of radio quality/coverage (e.g., Reference Signal Received Power (RSRP) and Reference Signal Received Quality (RSRQ)). To understand the conditions on SCell(s) or potential SCell(s) in a given available carrier, the network may configure the UE to perform Radio Resource Management (RRM) measurements.

Typically, the network may be assisted by RRM measurements to be reported by a UE. The network may configure the UE with measurement Identities (IDs) associated to reportConfig with event A1 (serving cell becomes better than threshold) in case this is a configured SCell, or A4 (neighbor cell becomes better than threshold) for carriers without a configured SCell. The measurement objects are associated to the carrier the network wants reports on. If the network is aware of the exact cells it wants the UE to measure, a so-called white cell list can be configured in the measurement object so that the UE is only required to measure these cells in that carrier.

FIG. 3 illustrates a process in which the network decides to setup CA or DC for a UE. The network then configures the UE to perform measurements, and the UE sends the appropriate measurement reports to the network. Based on the received measurement reports, the network makes a decision on SCell addition or SCell activation and then configures the UE to add the selected SCell(s).

With the introduction of DC in Release 12, it was possible to add what is called Secondary Cell Group (SGC) configuration to the UE. The main benefit would be that the UE could in principle add a cell from another eNB. Protocol-wise, that would require different MAC entities, one for each cell group. The UE will have two cell groups, one associated to the PCell (master node) and another associated to a Primary Secondary Cell (PSCell) (of the secondary eNB), where each group may possibly have their own associated SCells.

When it comes to adding SCells, when the UE is in single connectivity, the RRCConnectionReconfiguration message may carry a cell index (so MAC identifiers are optimized, i.e., shorter), cell identifier and carrier frequency, common parameters, and state information, introduced in Release 15 (activated or dormant).

Below, the SCellToAddModList included in the RRCConnectionReconfiguration is illustrated and described.

```
SCellToAddModList-r10 ::=            SEQUENCE (SIZE (1..maxSCell-r10))
  OF SCellToAddMod-r10
SCellToAddMod-r10 ::=                SEQUENCE {
    sCellIndex-r10                     SCellIndex-r10,
    cellIdentification-r10             SEQUENCE {
      physCellId-r10                     PhysCellId,
      dl-CarrierFreq-r10                 ARFCN-ValueEUTRA
    }                                                  OPTIONAL,-- Cond
SCellAdd
    radioResourceConfigCommonSCell-r10
    RadioResourceConfigCommonSCell-r10 OPTIONAL,   -- Cond SCellAdd
    radioResourceConfigDedicatedSCell-r10
    RadioResourceConfigDedicatedSCell-r10 OPTIONAL,   -- Cond
SCellAdd2
    ...,
    [[ dl-CarrierFreq-v1090            ARFCN-ValueEUTRA-v9e0 OPTIONAL
    -- Cond EARFCN-max
    ]],
    [[ antennaInfoDedicatedSCell-v10i0     AntennaInfoDedicated-
v10i0 OPTIONAL    -- Need ON
    ]],
    [[ srs-SwitchFromServCellIndex-r14     INTEGER (0.. 31) OPTIONAL
    -- Need ON
    ]],
    [[ sCellState-r15                      ENUMERATED {activated,
dormant}   OPTIONAL    -- Need ON
    ]]
}
```

1.2 Inter-Radio Access Technology (RAT) and Inter Fifth Generation (5G) Core (5GC) Interworking in LTE and New Radio (NR)

5G in 3GPP introduces both a new core network, which is referred to as the 5GC, and a new Radio Access Network (RAN), which is referred to as NR. The 5GC will, however, also support RATs other than NR. It has been agreed that LTE (or Evolved Universal Terrestrial Radio Access (E-UTRA)) should also be connected to 5GC. LTE base stations (eNBs) that are connected to 5GC are called next generation eNBs (ng-eNBs) and are part of Next Generation RAN (NG-RAN), which also includes NR base stations called gNBs. FIG. 4 shows how the base stations are connected to each other and the nodes in 5GC. In particular, FIG. 4 is the 5G System (5GS) architecture containing 5GC and NG-RAN.

There are different ways to deploy a 5G network with or without interworking with LTE (also referred to as E-UTRA) and Evolved Packet Core (EPC), as depicted in FIG. 5. In principle, NR and LTE can be deployed without any interworking, denoted by NR Stand-Alone (SA) operation, that is the gNB in NR can be connected to 5GC and the eNB can be connected to EPC with no interconnection between the two (Option 1 and Option 2 in FIG. 5). On the other hand, the first supported version of NR is the so-called Evolved Universal Terrestrial Radio Access Network (E-UTRAN) NR DC (EN-DC), illustrated by Option 3 in FIG. 5. In such a deployment, DC between NR and LTE is applied with LTE as the master and NR as the secondary node. The RAN node (NR base station (gNB)) supporting NR may not have a control plane connection to the core network (EPC); instead, the gNB relies on the LTE as master node (Master eNB (MeNB)). This is also called "Non-standalone NR". Notice that in this case the functionality of an NR cell is limited and would be used for connected mode UEs as a booster and/or diversity leg, but an RRC_IDLE UE cannot camp on these NR cells.

With introduction of 5GC, other options may also be valid. As mentioned above, Option 2 in FIG. 5 supports SA NR deployment where the gNB is connected to 5GC. Similarly, LTE can also be connected to 5GC using Option 5 (also known as enhanced LTE (eLTE), E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes). It is worth noting that Option 4 and Option 7 are other variants of DC between LTE and NR which will be standardized as part of NG-RAN connected to 5GC, denoted by Multi-Radio DC (MR-DC). Under the MR-DC umbrella, we have:

EN-DC (Option 3): LTE is the master node and NR is the secondary node (EPC CN employed)

NR E-UTRA (NE)-DC (Option 4): NR is the master node and LTE is the secondary node (5GC employed)

Next Generation DC (NG-DC (Option 7): LTE is the master node and NR is the secondary node (5GC employed)

NR-DC (variant of Option 2): DC where both the master and secondary nodes are NR (5GC employed).

As migration for these options may differ from different operators, it is possible to have deployments with multiple options in parallel in the same network, e.g. there could be an eNB base station supporting Options 3, 5, and 7 in the same network as an NR base station supporting Options 2 and 4. In combination with DC solutions between LTE and NR, it is also possible to support CA in each cell group (i.e., Master Cell Group (MCG) and SCG) and DC between nodes on the same RAT (e.g., NR-NR DC). For the LTE cells, a consequence of these different deployments is the co-existence of LTE cells associated to eNBs connected to EPC, 5GC, or both EPC/5GC.

1.3 Resume From RRC_Inactive in NR

The procedures in 3GPP TS 38.331 V15.5.0 regarding resumption of an RRC connection from RRC_INACTIVE are specified in section 5.3.13, shown below.

5.3.13.1 General

See FIG. 6 of the Present Disclosure

FIG. 5.3.13.1-1: RRC Connection Resume, Successful

. . .

5.3.13.3 Actions Related to Transmission of RRCResumeRequest or RRCResumeRequest1 Message
The UE shall set the contents of RRCResumeRequest or RRCResumeRequest1 message as follows:
1> if field useFullResumeID is signalled in SIB1:
   2> select RRCResumeRequest1 as the message to use;
   2> set the resumeIdentity to the stored fullI-RNTI value;
1> else:
   2> select RRCResumeRequest as the message to use;
   2> set the resumeIdentity to the stored shortI-RNTI value;
1> restore the RRC configuration and AS security context from the stored UE Inactive AS context except the masterCellGroup;
1> set the resumeMAC-I to the 16 least significant bits of the MAC-I calculated:
   2> over the ASN.1 encoded as per clause 8 (i.e., a multiple of 8 bits) VarResumeMAC-Input;
   2> with the $K_{RRCint}$ key in the UE Inactive AS Context and the previously configured integrity protection algorithm; and
   2> with all input bits for COUNT, BEARER and DIRECTION set to binary ones;
1> restore the RRC configuration and the $K_{gNB}$ and $K_{RRCint}$ keys from the UE Inactive AS context except the masterCellGroup and pdcp-Config;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the $K_{UPenc}$ key;
1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;
NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering.
If lower layers indicate an integrity check failure while T319 is running, perform actions specified in 5.3.13.5.
The UE shall continue cell re-selection related measurements as well as cell re-selection evaluation.

5.3.13.4 Reception of the RRCResume by the UE
The UE shall:
1> stop timer T319;
1> stop timer T380, if running;
1> if the RRCResume includes the fullConfig:
   2> perform the full configuration procedure as specified in 5.3.5.11;
1> else:
   2> restore the masterCellGroup and pdcp-Config from the UE Inactive AS context;
1> discard the UE Inactive AS context except the ranNotificationAreaInfo;
1> if the RRCResume includes the masterCellGroup:
   2> perform the cell group configuration for the received masterCellGroup according to 5.3.5.5;
1> if the RRCResume includes the radioBearerConfig:
   2> perform the radio bearer configuration according to 5.3.5.6;
1> resume SRB2 and all DRBs;
1> if stored, discard the cell reselection priority information provided by the cellReselectionPriorities or inherited from another RAT;
1> stop timer T320, if running;
1> if the RRCResume message includes the measConfig:
   2> perform the measurement configuration procedure as specified in 5.5.2;
1> resume measurements if suspended;
1> if T390 is running:
   2> stop timer T390 for all access categories;
   2> perform the actions as specified in 5.3.14.4;
1> if T302 is running:
   2> stop timer T302;
   2> perform the actions as specified in 5.3.14.4;
1> enter RRC_CONNECTED;
1> indicate to upper layers that the suspended RRC connection has been resumed;
1> stop the cell re-selection procedure;
1> consider the current cell to be the PCell;
1> set the content of the of RRCResumeComplete message as follows:
   2> if the upper layer provides NAS PDU, set the dedicatedNAS-Message to include the information received from upper layers;
   2> if the upper layer provides a PLMN, set the selectedPLMN-Identity to PLMN selected by upper layers (TS 24.501 [23]) from the PLMN(s) included in the plinn-IdentityList in SIB1;
   2> if the masterCellGroup contains the report UplinkTxDirectCurrent:
      3> include the uplinkTxDirectCurrentList;
1> submit the RRCResumeComplete message to lower layers for transmission;
1> the procedure ends.

1.4 Suspend/Resume in LTE and Relation to CA/SCell and SCG Additions

A very typical scenario or use case is a UE with some burst traffic that comes and goes, e.g. some video packets and idle periods of transmission/reception, then comes live again. To save UE power, the network transitions the UE from connected to idle during these periods. Then, the UE comes back again (either via paging or UE request to get connected) and accesses the network.

In LTE Release 13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

Reduce latency, e.g., for smart phones accessing the Internet

Reduced signaling leads to reduced battery consumption for machine type devices sending very little data.

The Release 13 solution is based on the UE sending an RRCConnectionResumeRequest message to the network and, in response, the UE may receive an RRCConnection-Resume from the network. The RRCConnectionResume is not encrypted but integrity protected.

The resume procedure in LTE can be found in the RRC specifications (TS 36.331). As the UE performing resume is in RRC_IDLE (with suspended AS context), a transition from RRC_IDLE to RRC_CONNECTED is triggered. Hence, this is modelled in the specifications in the same subclause that captures the RRC connection establishment (subclause 5.3.3 RRC connection establishment).

There are a few things relevant to highlight in the SCG configurations and SCell configurations for MCGs in relation to suspend/resume procedures. Upon suspension, it is defined that the UE stores its used RRC configuration. In other words, if the UE is operating in any DC mode (and has an SCG configuration) or has just configured SCells in the MCG, the UE stores all these configurations. However, upon resume, at least until Release 15, it is defined that the UE shall release the SCG configurations and SCell configurations, as shown below:

5.3.3.2 Initiation

The UE initiates the procedure when upper layers request establishment or resume of an RRC connection while the UE is in RRC_IDLE or when upper layers request resume of an RRC connection or RRC layer requests resume of an RRC connection for, e.g. RNAU or reception of RAN paging while the UE is in RRC_INACTIVE.

. . .

Except for NB-IoT, upon initiating the procedure, if connected to EPC or 5GC, the UE shall:

1> if the UE is resuming an RRC connection from a suspended RRC connection or from RRC_INACTIVE:
   2> if the UE is resuming an RRC connection from a suspended RRC connection:
      3> if the UE was configured with EN-DC:
         4> perform EN-DC release, as specified in TS 38.331 [82], clause 5.3.5.10;
   2> release the MCG SCell(s), if configured, in accordance with 5.3.10.3a;

. . .

2> release the entire SCG configuration, if configured, except for the DRB configuration (as configured by drb-ToAddModListSCG);

Hence, when the UE comes from RRC_IDLE with the context, if the network wants to add SCell(s) to the MCG or add an SCG, the network needs to do that from scratch, even if the UE is suspending and resuming in the same cell/area where all the previous PCell and SCell configurations are still valid from a radio conditions perspective.

As the use case of UEs with burst traffic constantly being suspended and resuming in the same cell is quite typical, 3GPP has standardized a solution in LTE to enable the UE to assist the network with measurements performed while the UE is in RRC_IDLE so that the network could speed up the setup of CA or DC. That solution is described below.

1.5 Existing Solution for Early Measurements Upon Idle to Connected Transition in LTE (Release 15)

In LTE Release 15, it is possible to configure the UE to report so-called early measurements upon the transition from idle to connected state. These measurements are measurements that the UE can perform in idle state, and according to a configuration provided by the source cell with the intention to receive these measurements immediately after the UE is connected and quickly sets up CA and/or other forms of DC (e.g., EN-DC, MR-DC, etc.) without the need to first provide a measurement configuration (measConfig) in RRC_CONNECTED, as shown in previous sections, and waits for hundreds of milliseconds until first samples are collected, monitored, and then the first reports are triggered and transmitted to the network.

1.51 Measurement Configuration for Early Measurements Upon Resume in LTE

A first aspect of the existing solution, as standardized in E-UTRA 3GPP TS 36.331, is described in 5.6.20 Idle Mode Measurements. The UE can receive these idle mode measurement configurations in the system information (System Information Block 5 (SIB5)) in the field MeasIdleConfigSIB-r15, indicating up to 8 cells or ranges of cell IDs on which to perform measurements. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signaling is shown below:

```
                    RRCConnectionRelease message
-- ASN1START
RRCConnectionRelease ::=                SEQUENCE {
    rrc-TransactionIdentifier               RRC-TransactionIdentifier,
    criticalExtensions                      CHOICE {
        c1                                      CHOICE {
            rrcConnectionRelease-r8                 RRCConnectionRelease-r8-IEs,
            spare3 NULL, spare2 NULL, spare1 NULL
        },
        criticalExtensionsFuture                SEQUENCE { }
    }
}
-- other info has been omitted
RRCConnectionRelease-v1530-IEs ::= SEQUENCE {
    drb-ContinueROHC-r15                    ENUMERATED {true} OPTIONAL, -
Cond UP-EDT
```

-continued

```
nextHopChainingCount-r15                NextHopChainingCount
    OPTIONAL, -- Cond UP-EDT
measIdleConfig-r15                      MeasIdleConfigDedicated-r15
    OPTIONAL, -- Need ON
rrc-InactiveConfig-r15                  RRC-InactiveConfig-r15
    OPTIONAL, -- Need OR
cn-Type-r15                             ENUMERATED {epc,fivegc}
    OPTIONAL, -- Need OR
nonCriticalExtension                    SEQUENCE { }        OPTIONAL
}
-- ASN1STOP
            MeasIdleConfig information element
-- ASN1START
MeasIdleConfigSIB-r15 ::= SEQUENCE {
    measIdleCarrierListEUTRA-r15        EUTRA-CarrierList-r15,
    ...
}
MeasIdleConfigDedicated-r15 ::= SEQUENCE {
    measIdleCarrierListEUTRA-r15        EUTRA-CarrierList-r15
    OPTIONAL, -- Need OR
    measIdleDuration-r15                ENUMERATED {sec10, sec30, sec60,
sec120,
                                            sec180, sec240, sec300, spare},
    ...
}
EUTRA-CarrierList-r15 ::= SEQUENCE (SIZE (1..maxFreqIdle-r15)) OF
MeasIdleCarrierEUTRA-r15
MeasIdleCarrierEUTRA-r15::=             SEQUENCE {
    carrierFreq-r15                     ARFCN-ValueEUTRA-r9,
    allowedMeasBandwidth-r15            AllowedMeasBandwidth,
    validityArea-r15                    CellList-r15  OPTIONAL, --
Need OR
    measCellList-r15                    CellList-r15     OPTIONAL, --
Need OR
    reportQuantities                    ENUMERATED {rsrp, rsrq, both},
    qualityThreshold-r15                SEQUENCE {
        idleRSRP-Threshold-r15             RSRP-Range
    OPTIONAL, -- Need OR
        idleRSRQ-Threshold-r15             RSRQ-Range-r13
    OPTIONAL   -- Need OR
    }                                       OPTIONAL,  --
Need OR
    ...
}
CellList-r15 ::=  SEQUENCE (SIZE (1.. maxCellMeasIdle-r15))
OF PhysCellIdRange
-- ASN1STOP
```

MeasIdleConfig field descriptions allowedMeasBandwidth
If absent, the value corresponding to the downlink bandwidth indicated by the dl-Bandwidth included in MasterInformationBlock of serving cell applies.
carrierFreq
Indicates the E-UTRA carrier frequency to be used for measurements during IDLE mode.
measIdleCarrierListEUTRA
Indicates the E-UTRA carriers to be measured during IDLE mode.
measIdleDuration
Indicates the duration for performing measurements during IDLE mode for measurements assigned via RRCConnectionRelease. Value sec10 correspond to 10 seconds, value sec30 to 30 seconds and so on.
qualityThreshold
Indicates the quality thresholds for reporting the measured cells for IDLE mode measurements.
reportQuantities
Indicates which measurment quantities UE is requested to report in the IDLE mode measurement report.
measCellList
Indicates the list of cells which the UE is requested to measure and report for IDLE mode measurements.
validityArea MeasIdleConfig field descriptions Indicates the list of cells within which UE is requested to do IDLE mode measurements.
If the UE reselects to a cell outside this list, the measurements are no longer required.

Carrier information and cell list: The UE is provided with a list of carriers and optionally with a list of cells on which the UE shall perform measurements. The fields s-NonIntraSearch in SystemInformationBlockType3 do not affect the UE measurement procedures in IDLE mode.

Timer T331: Upon the reception of that measurement configuration, the UE starts a timer T331 with the value provided in measIdleDuration, which can go from 0 to 300 seconds. The timer stops upon receiving RRCConnectionSetup, RRCConnectionResume which indicates a transition to RRC_CONNECTED. That concept exists to limit the amount of time the UE performs measurements for the purpose of early measurements.

Validity Area: Another concept introduced in the LTE Release 15 solution is a validity area, which comprises a list of Physical Cell Identities (PCIs). The intention is to limit the area where CA or DC may be setup later when the UE resumes/sets up the connection, so the early measurements are somewhat useful for that purpose. If validityArea is configured and the UE reselects to a serving cell whose PCI does not match any entry in validityArea for the corresponding carrier frequency, the timer T331 is stopped. Then, the UE stops to perform IDLE measurements and releases the configuration (i.e., VarMeasIdleConfig). Notice that this does not necessarily imply that the UE releases the idle measurements that were configured in Release 15 and that were performed, i.e. these may still be stored and possibly requested by the network. In addition, the UE may continue with IDLE mode measurements according to the broadcasted SIB5 configuration after the timer T331 has expired or stopped.

Minimum quality threshold: Notice also that only measurements above a certain threshold shall be stored as the cell candidates for CA setup need to be within a minimum acceptable threshold. How the UE performs measurements in IDLE mode is up to UE implementation as long as RAN4 requirements for measurement reporting defined in 36.133 (see, e.g., V15.5.0) are met.

The UE behavior is shown below in more detail as captured in TS 36.331:

5.6.20 Idle Mode Measurements
5.6.20.1 General
This procedure specifies the measurements done by a UE in RRC_IDLE when it has an IDLE mode measurement configuration and the storage of the available measurements by a UE in both RRC_IDLE and RRC_CONNECTED.
5.6.20.2 Initiation
While T331 is running, the UE shall:
1> perform the measurements in accordance with the following:
  2> for each entry in measIdleCarrierListEUTRA within VarMeasIdleConfig:
    3> if UE supports carrier aggregation between serving carrier and the carrier frequency and bandwidth indicated by carrierFreq and allowedMeasBandwidth within the corresponding entry;
    4> perform measurements in the carrier frequency and bandwidth indicated by carrierFreq and allowedMeasBandwidth within the corresponding entry;
    NOTE: The fields s-NonIntraSearch in SystemInformationBlockType3 do not affect the UE measurement procedures in IDLE mode. How the UE performs measurements in IDLE mode is up to UE implementation as long as the requirements in TS 36.133 [16] are met for measurement reporting. UE is not required to perform idle measurements if SIB2 idle measurement indication is not configured.
    4> if the measCellList is included:
      5> consider PCell and cells identified by each entry within the measCellList to be applicable for idle mode measurement reporting;
    4> else:
      5> consider PCell and up to maxCellMeasIdle strongest identified cells whose RSRP/RSRQ measurement results are above the value(s) provided in qualityThreshold (if any) to be applicable for idle mode measurement reporting;
    4> store measurement results for cells applicable for idle mode measurement reporting within the VarMeasIdleReport;
  3> else:
    4> do not consider the carrier frequency to be applicable for idle mode measurement reporting;
1> if validityArea is configured in VarMeasIdleConfig and UE reselects to a serving cell whose physical cell identity does not match any entry in validityArea for the corresponding carrier frequency:
  2> stop T331;
5.6.20.3 T331 Expiry or Stop
The UE shall:
1> if T331 expires or is stopped:
  2> release the VarMeasIdleConfig;
NOTE: It is up to UE implementation whether to continue IDLE mode measurements according to SIB5 configuration after T331 has expired or stopped.

1.5.2 Indication of Available Early Measurements Upon Resume/Setup in LTE

Another aspect of the existing solution occurs when the UE tries to resume or setup a call from RRC_IDLE without context. If the previous step is performed, i.e. if the UE is configured to store idle measurements, the network may request the UE after resume/setup (after security is activated) whether the UE has idle measurements available.

In the case this UE is setting up a connection coming from RRC_IDLE without the AS Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication. The flag in RRCReconnectionSetupComplete and procedure text are shown below:

```
RRCConnectionSetupComplete-v1530-IEs   ::= SEQUENCE {
    logMeasAvailableBT-r15          ENUMERATED {true}
    OPTIONAL,
    logMeasAvailableWLAN-r15        ENUMERATED {true}
    OPTIONAL,
    idleMeasAvailable-r15           ENUMERATED {true}
    OPTIONAL,
    flightPathInfoAvailable-r15     ENUMERATED {true}
    OPTIONAL,
    connectTo5GC-r15                ENUMERATED {true}
    OPTIONAL,
    registeredAMF-r15               RegisteredAMF-r15
    OPTIONAL,
```

```
    s-NSSAI-list-r15            SEQUENCE(SIZE (1..maxNrofS-NSSAI-
r15)) OF S-NSSAI-r15 OPTIONAL,
    ng-5G-S-TMSI-Bits-r15       CHOICE {
        ng-5G-S-TMSI-r15            NG-5G-S-TMSI-r15,
        ng-5G-S-TMSI-Part2-r15      BIT STRING (SIZE (8))
    }                                   OPTIONAL,
    nonCriticalExtension        RRCConnectionSetupComplete-v1540-
IEs  OPTIONAL
}
```

5.3.3.4 Reception of the RRCConnectionSetup by the UE

NOTE 1: Prior to this, lower layer signalling is used to allocate a C-RNTI. For further details see TS 36.321 [6];

The UE shall:

1> if the RRCConnectionSetup is received in response to an RRCConnectionResumeRequest from a suspended RRC connection:

. . .

1> set the content of RRCConnectionSetupComplete message as follows:

2> if the RRCConnectionSetup is received in response to an RRCConnectionResumeRequest:

. . .

2> if the UE is connected to EPC:
        3> except for NB-IoT:

. . .

4> if the SIB2 contains idleModeMeasurements, and the UE has IDLE mode measurement information available in VarMeasIdleReport:
                5> include the idleMeasAvailable;
            4> stop T331 (if running);

. . .

3> for NB-IoT:
            4> if the UE supports serving cell idle mode measurements reporting and servingCellMeasInfo is present in SystemInformationBlockType2-NB:
                5> set the measResultServCell to include the measurements of the serving cell;
            NOTE 2: The UE includes the latest results of the serving cell measurements as used for cell selection/reselection evaluation, which are performed in accordance with the performance requirements as specified in TS 36.133 [16].
        3> include dcn-ID if a DCN-ID value (see TS 23.401 [41]) is received from upper layers;

In the case this UE is setting up a connection coming from RRC_IDLE but with a stored AS Context (i.e., resume from suspended), the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area. Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication. The flag in RRCReconnectionResumeComplete and procedure text are shown below:

```
RRCConnectionResumeComplete-v1530-IEs   ::= SEQUENCE {
    logMeasAvailableBT-r15          ENUMERATED {true}
        OPTIONAL,
    logMeasAvailableWLAN-r15        ENUMERATED {true}
        OPTIONAL,
    idleMeasAvailable-r15           ENUMERATED {true}
        OPTIONAL,
    flightPathInfoAvailable-r15     ENUMERATED {true}
        OPTIONAL,
    nonCriticalExtension            SEQUENCE { }
        OPTIONAL
}
```

5.3.3.4a Reception of the RRCConnectionResume by the UE

The UE shall:

. . .

1> set the content of RRCConnectionResumeComplete message as follows:
    2> except for NB-IoT:

. . .

3> if the SIB2 contains idleModeMeasurements, and the UE has IDLE mode measurement information available in VarMeasIdleReport:
            4> include the idleMeasAvailable;
        3> stop T331 (if running);
    2> for NB-IoT:
        3> if the UE supports serving cell idle mode measurements reporting and servingCellMeasInfo is present in SystemInformationBlockType2-NB:
            4> set the measResultServCell to include the measurements of the serving cell;
            NOTE: The UE includes the latest results of the serving cell measurements as used for cell selection/reselection evaluation, which are performed in accordance with the performance requirements as specified in TS 36.133 [16].
1> submit the RRCConnectionResumeComplete message to lower layers for transmission;
1> the procedure ends.

1.5.3 Reporting of Early Measurements Upon Resume/Setup in LTE

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements. This is illustrated in FIG. 7.

5.6.5.3 Reception of the UEInformationRequest Message

Upon receiving the UEInformationRequest message, the UE shall, only after successful security activation:

. . .

1> if the idleModeMeasurementReq is included in the UEInformationRequest and UE has stored VarMeasIdleReport:

2> set the measResultListIdle in the UEInformationResponse message to the value of idleMeasReport in the VarMeasIdleReport;

2> discard the VarMeasIdleReport upon successful delivery of the UEInformationResponse message confirmed by lower layers;

. . .

| UEInformationRequest message |
|---|
| ```
-- ASN1START
UEInformationRequest-r9   ::=              SEQUENCE {
    rrc-TransactionIdentifier              RRC-TransactionIdentifier,
    criticalExtensions                     CHOICE {
        c1                                 CHOICE {
            ueInformationRequest-r9                UEInformationRequest-r9-IEs,
            spare3 NULL, spare2 NULL, spare1 NULL
        },
        criticalExtensionsFuture           SEQUENCE { }
    }
}
UEInformationRequest-r9-IEs ::=            SEQUENCE {
    rach-ReportReq-r9                      BOOLEAN,
    rlf-ReportReq-r9                       BOOLEAN,
    nonCriticalExtension                   UEInformationRequest-v930-IEs        OPTIONAL
}
UEInformationRequest-v930-IEs ::= SEQUENCE {
    lateNonCriticalExtension               OCTET STRING                         OPTIONAL,
    nonCriticalExtension                   UEInformationRequest-v1020-IEs       OPTIONAL
}
UEInformationRequest-v1020-IEs ::= SEQUENCE {
    logMeasReportReq-r10                   ENUMERATED {true}                    OPTIONAL, -- Need ON
    nonCriticalExtension                   UEInformationRequest-v1130-IEs       OPTIONAL
}
UEInformationRequest-v1130-IEs ::= SEQUENCE {
    connEstFailReportReq-r11               ENUMERATED {true}                    OPTIONAL, -- Need ON
    nonCriticalExtension                   UEInformationRequest-v1250-IEs       OPTIONAL
}
UEInformationRequest-v1250-IEs ::= SEQUENCE {
    mobilityHistoryReportReq-r12           ENUMERATED {true}                    OPTIONAL, -- Need ON
    nonCriticalExtension                   UEInformationRequest-v1530-IEs       OPTIONAL
}
UEInformationRequest-v1530-IEs ::= SEQUENCE {
    idleModeMeasurementReq-r15             ENUMERATED {true}                    OPTIONAL, -- Need ON
    flightPathInfoReq-r15                  FlightPathInfoReportConfig-r15       OPTIONAL, -- Need ON
    nonCriticalExtension                   SEQUENCE { }                         OPTIONAL
}
-- ASN1STOP
``` |

| UEInformationResponse message |
|---|
| ```
-- ASN1START
UEInformationResponse-r9   ::=             SEQUENCE {
    rrc-TransactionIdentifier              RRC-TransactionIdentifier,
    criticalExtensions                     CHOICE {
        c1                                 CHOICE {
            ueInformationResponse-r9               UEInformationResponse-r9-IEs,
            spare3 NULL, spare2 NULL, spare1 NULL
        },
        criticalExtensionsFuture           SEQUENCE { }
``` |

-continued

| UEInformationResponse message |
| --- |

```
    }
}
UEInformationResponse-v1530-IEs ::= SEQUENCE {
    measResultListIdle-r15          MeasResultListIdle-r15
    OPTIONAL,
    flightPathInfoReport-r15        FlightPathInfoReport-r15
    OPTIONAL, nonCriticalExtension          SEQUENCE { }
    OPTIONAL
}
```

1.6 Contention Resolution Procedure

The random access procedure is used by a UE in order to, e.g., establish or resume a connection in a cell. Unless the UE has been provided with dedicated resources for the access, it will then select a random resource, e.g. the Physical Random Access Channel (PRACH) preamble, out of a set of available resources. There is then a certain risk that more than one UE happens to select the same random resource when they perform their initial transmission (Msg1). This leads to that more than one UE may consider the response (Msg2) to be addressed to it, and that more than one UE then may transmit a Msg3 in the same allocated uplink grant. In order to make sure that only one UE, in these cases, considers itself to be the one that at the end has managed to establish/resume its connection through the random access procedure, a so-called contention resolution procedure is used.

The network then returns a UE Contention Resolution Identity in a MAC CE to the UE together with Msg4 (the RRCSetup or RRCResume message). It consists of the first 48 bits of the uplink Common Control Channel (CCCH) Service Data Unit (SDU) (of Msg3). The UE that receives a UE Contention Resolution Identity that matches the uplink CCCH SDU it transmitted will then consider contention resolution as successful and will continue with the connection establishment/resume procedure.

SUMMARY

Systems and methods are disclosed herein for enabling reporting of a subset of measurements performed by a wireless device when in an idle or inactive state to a cellular communications network. In one embodiment, a method performed by a wireless device for reporting measurements to a cellular communications network comprises performing measurements while in an idle or inactive state, storing the measurements, determining a subset of the measurements to be reported by the wireless device, and reporting the determined subset of the measurements to the cellular communications network. In this manner, only desired measurements can be reported, which reduces the amount of information that needs to be reported by the wireless device.

In one embodiment, the subset of the measurements is limited to measurements performed by the wireless device while in the idle or inactive state that are associated with one or more particular Radio Access Technologies (RATs).

In one embodiment, the subset of the measurements is further limited to measurements performed by the wireless device while in the idle or inactive state that are associated with one or more particular cells, wherein the one or more particular cells are determined by: (a) a list of cells, (b) a maximum number of cells, (c) cells that have a signal quality that is above a specific threshold, (d) cells on a serving frequency of the wireless device, (e) cells on a non-serving frequency of the wireless device, (f) cells on a particular frequency, or (g) a combination of any two or more of (a)-(f).

In one embodiment, the subset of the measurements is further limited to one or more particular beam measurements performed by the wireless device while in the idle or inactive state for beams that are associated with one or more particular cells, the one or more particular beam measurements being determined by: (a) a maximum number of beams, (b) beams that have a signal quality above a specific threshold, (c) both (a) and (b).

In one embodiment, the subset of the measurements is further limited to measurements performed by the wireless device while in an idle or inactive state that are associated with one or more particular frequencies.

In one embodiment, the subset of the measurements is further limited to measurements performed by the wireless device while in an idle or inactive state that are associated with one or more particular measurement quantities per beam.

In one embodiment, determining the subset of the measurements to be reported by the wireless device comprises receiving a request for reporting the subset of the measurements from a network node. In one embodiment, the request is received via a UEInformationRequest. In one embodiment, reporting of the determined subset of the measurements comprises reporting the determined subset of the measurements in a UEInformationResponse.

In another embodiment, the request is received via a Radio Resource Control (RRC) resume message. In one embodiment, reporting the determined subset of the measurements comprises reporting the determined subset of the measurements in an RRC resume complete message.

In another embodiment, the request is received via a random access response. In one embodiment, reporting the determined subset of the measurements comprises reporting the determined subset of the measurements in a RRC resume request or in a message that is multiplexed with the RRC resume request.

In one embodiment, the method further comprises performing one or more actions to handle any measurements that are not reported in the subset of the measurements. In one embodiment, the one or more actions comprise deleting at least some of the measurements that are not reported in the subset of the measurements. In one embodiment, the one or more actions comprise keeping at least some of the measurements that are not reported in the subset of the measurements.

Corresponding embodiments of a wireless device are also disclosed. In one embodiment, a wireless device for reporting measurements to a cellular communications network is adapted to perform measurements while in an idle or inactive state, store the measurements, determine a subset of the measurements to be reported by the wireless device, and report the determined subset of the measurements to the cellular communications network.

In one embodiment, a wireless device for reporting measurements to a cellular communications network comprises one or more transmitters, one or more receivers, and processing circuitry associated with the one or more transmitters and the one or more receivers. The processing circuitry is configured to cause the wireless device to perform measurements while in an idle or inactive state, store the measurements, determine a subset of the measurements to be reported by the wireless device, and report the determined subset of the measurements to the cellular communications network.

Embodiments performed by a network node are also disclosed. In one embodiment, a method performed by a network node comprises providing, to a wireless device, information that indicates a subset of measurements to be reported by the wireless device, where the measurements are measurements performed by the wireless device in an idle or inactive state. The method further comprises receiving the subset of the measurements from the wireless device.

In one embodiment, the subset of the measurements is limited to measurements performed by the wireless device while in the idle or inactive state that are associated with one or more particular RATs.

In one embodiment, the subset of the measurements is further limited to measurements performed by the wireless device while in an idle or inactive state that are associated with one or more particular cells, wherein the one or more particular cells are determined by: (a) a list of cells, (b) a maximum number of cells, (c) cells that have a signal quality that is above a specific threshold, (d) cells on a serving frequency of the wireless device, (e) cells on a non-serving frequency of the wireless device, (f) cells on a particular frequency, or (g) a combination of any two or more of (a)-(f).

In one embodiment, the subset of the measurements is further limited to one or more particular beam measurements performed by the wireless device while in the idle or inactive state for beams that are associated with one or more particular cells, the one or more particular beam measurements being determined by: (a) a maximum number of beams, (b) beams that have a signal quality above a specific threshold, or (c) both (a) and (b).

In one embodiment, the subset of the measurements is further limited to measurements performed by the wireless device while in an idle or inactive state that are associated with one or more particular reference signal types.

In one embodiment, providing the information comprises providing the information in a UEInformationRequest.

In one embodiment, providing the information comprises providing the information in a RRC resume message.

In one embodiment, providing the information comprises providing the information in a random access response message.

Corresponding embodiments of a network node are also disclosed. In one embodiment, a network node is adapted provide, to a wireless device, information that indicates a subset of measurements to be reported by the wireless device, where the measurements are measurements performed by the wireless device in an idle or inactive state. The network is further adapted to receive the subset of the measurements from the wireless device.

In one embodiment, a network node comprises processing circuitry configured to cause the network node to provide, to a wireless device, information that indicates a subset of measurements to be reported by the wireless device, where the measurements are measurements performed by the wireless device in an idle or inactive state. The processing circuitry is further configured to cause the network node to receive the subset of the measurements from the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
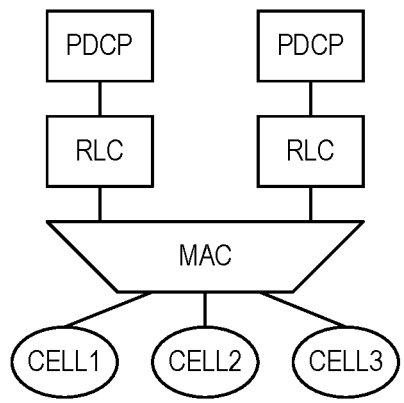
FIG. 1 is an illustration of Carrier Aggregation (CA)
Figure 2:
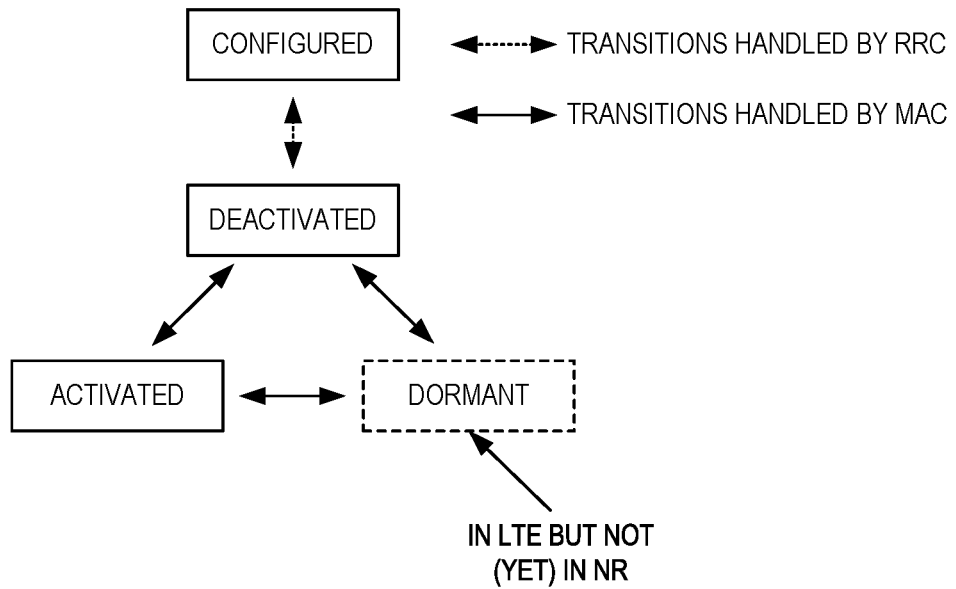
FIG. 2 illustrates three User Equipment (UE) states consisting of deactivated state, activated state, and dormant state.
Figure 3:
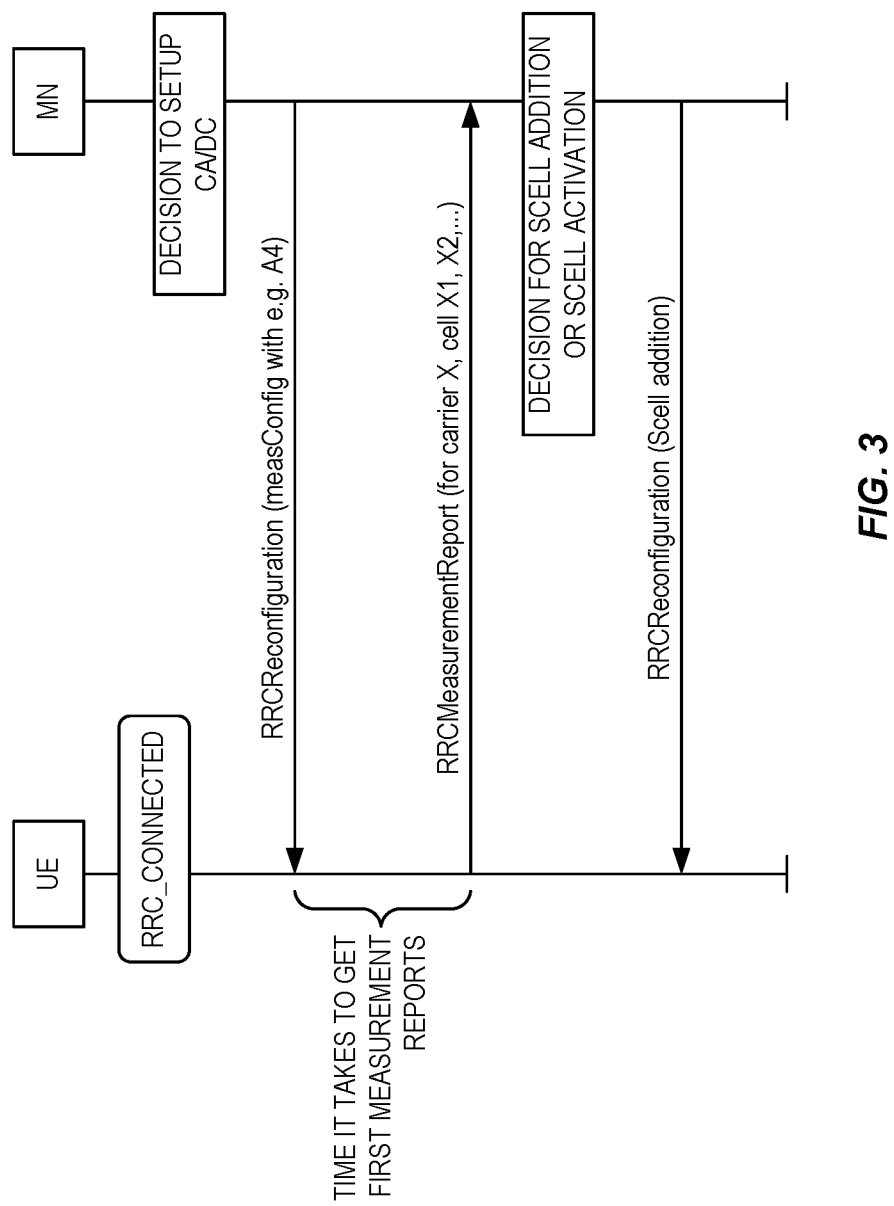
FIG. 3 illustrates a process in which the network decides to set up CA or Dual Connectivity (DC) for a UE.
Figure 4:
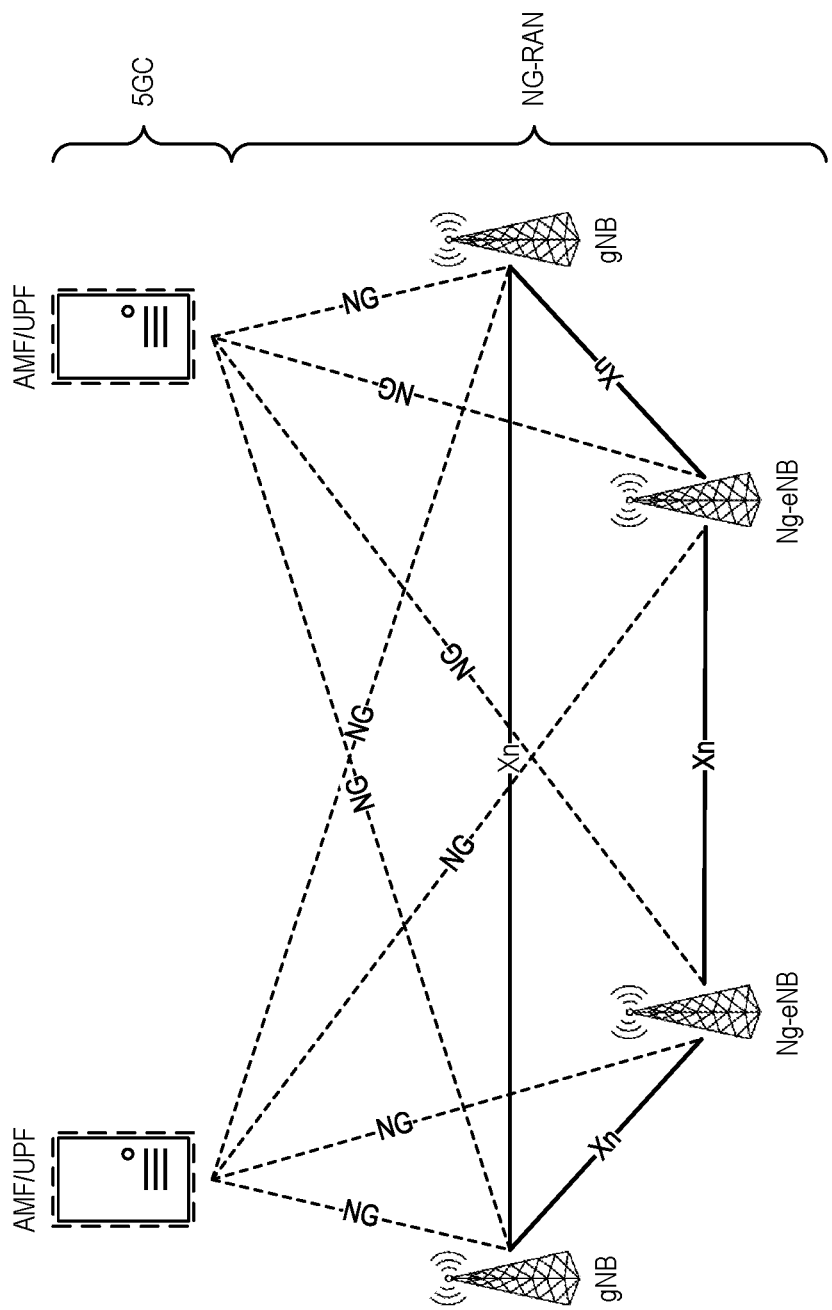
FIG. 4 illustrates the Fifth Generation (5G) System (5GS) architecture including the 5G Core (5GC) and the Next Generation Radio Access Network (NG-RAN)
Figure 5:
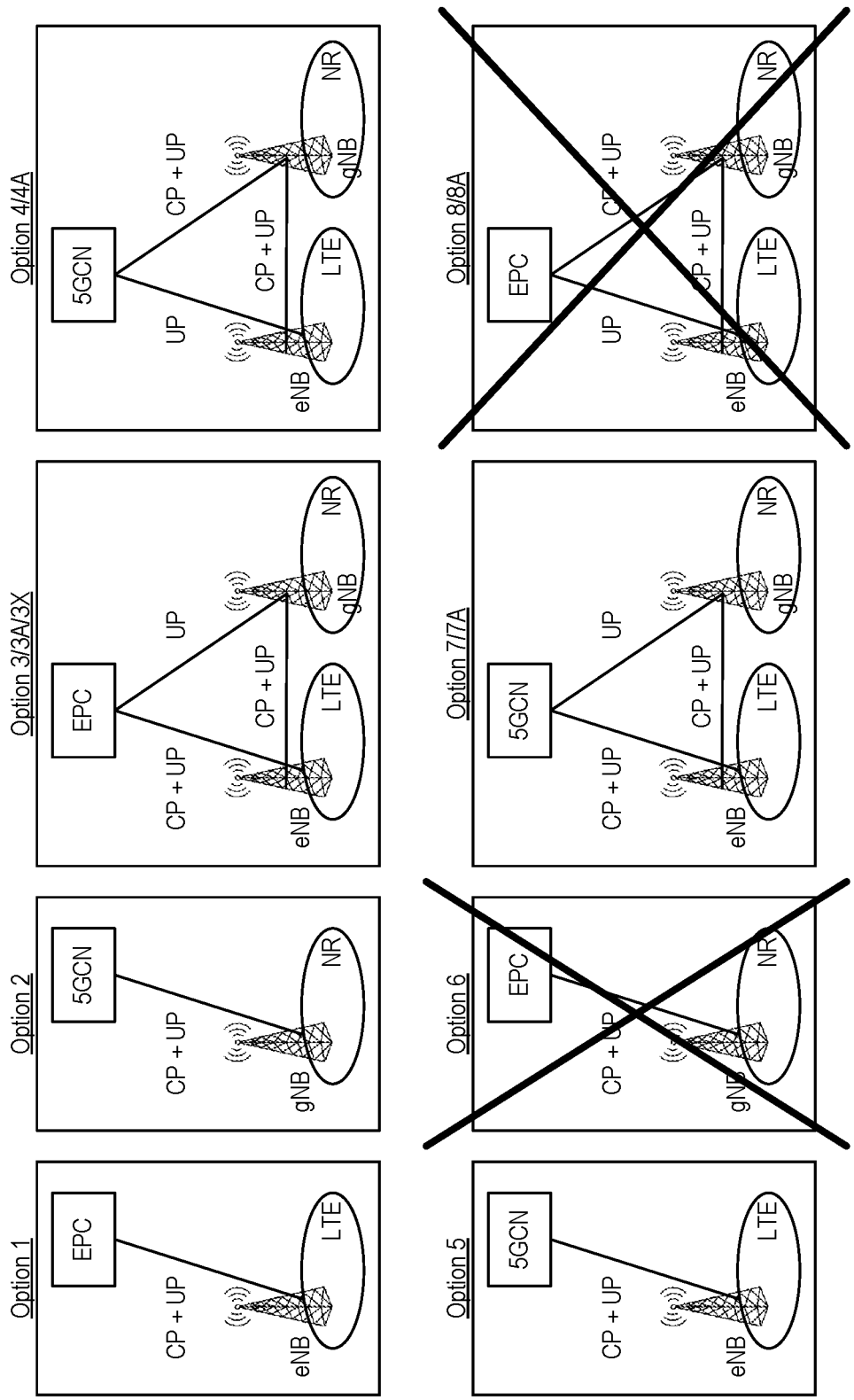
FIG. 5 illustrates numerous options for interworking between New Radio (NR) and Long Term Evolution (LTE)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In LTE Release 15, the concept of idle measurements was introduced, where a UE could be configured to measure on specific frequencies and/or cells while in RRC_IDLE or RRC_IDLE with suspend. When the UE established or resumed the connection, it could indicate in the RRCConnectionSetupComplete/RRCConnectionResumeComplete message that it had available measurements. The network could then send a UEInformationRequest message to the UE, and the UE would respond with a UEInformationResponse containing all idle measurements it had. The measurements in the message have the following structure:

```
UEInformationResponse-v1530-IEs ::= SEQUENCE {
    measResultListIdle-r15              MeasResultListIdle-r15
    OPTIONAL,
    flightPathInfoReport-r15            FlightPathInfoReport-r15
    OPTIONAL,
    nonCriticalExtension                SEQUENCE { }
    OPTIONAL
}
MeasResultListIdle-r15   ::= SEQUENCE (SIZE
(1..maxIdleMeasCarriers-r15)) OF MeasResultIdle-r15
MeasResultIdle-r15 ::= SEQUENCE {
    measResultServingCell-r15           SEQUENCE {
        rsrpResult-r15                  RSRP-Range,
        rsrqResult-r15                  RSRQ-Range-r13
    },
    measResultNeighCells-r15            CHOICE {
        measResultIdleListEUTRA-r15         MeasResultIdleListEUTRA-
r15,
        ...
    }                                                   OPTIONAL,
    ...
}
MeasResultListEUTRA ::=             SEQUENCE (SIZE
(1..maxCellReport)) OF MeasResultEUTRA
MeasResultEUTRA ::= SEQUENCE {
    physCellId                      PhysCellId,
    cgi-Info                        SEQUENCE {
        cellGlobalId                    CellGlobalIdEUTRA,
        trackingAreaCode                TrackingAreaCode,
        plmn-IdentityList               PLMN-IdentityList2
    OPTIONAL
    }                                               OPTIONAL,
    measResult                      SEQUENCE {
        rsrpResult                      RSRP-Range     OPTIONAL,
        rsrqResult                      RSRQ-Range     OPTIONAL,
        ...,
        [[ additionalSI-Info-r9             AdditionalSI-Info-r9
    OPTIONAL
    ]],
    [[ primaryPLMN-Suitable-r12             ENUMERATED {true}
```

```
                                -continued
OPTIONAL,
    measResult-v1250                RSRQ-Range-v1250
OPTIONAL
    ]],
    [[ rs-sinr-Result-r13           RS-SINR-Range-r13
OPTIONAL,
        cgi-Info-v1310              SEQUENCE {
            freqBandIndicator-r13       FreqBandIndicator-r11
OPTIONAL,
            multiBandInfoList-r13       MultiBandInfoList-r11
OPTIONAL,
            freqBandIndicatorPriority-r13   ENUMERATED {true}
OPTIONAL
        }                               OPTIONAL
    ]],
    [[
    measResult-v1360                RSRP-Range-v1360
OPTIONAL
    ]],
    [[
    cgi-Info-5GC-r15                SEQUENCE (SIZE (1..maxPLMN-r11)) OF
CellAccessRelatedInfo-5GC-r15           OPTIONAL
    ]]
    }
}
```

In NR, the same solution has been adopted as a baseline. In addition, a solution has been proposed where the network could request the early measurements in the RRCResume message and the UE would include the measurements in the RRCResumeComplete message. However, in NR, it has also been agreed to support further idle/inactive types of measurements compared to in LTE, e.g. beam level measurements per cell. In addition, the UE can be configured to measure both LTE and NR frequencies and/or cells. Thus, the idle/inactive measurement report may become significantly larger in Release 16, as a UE camping in LTE can be configured with both LTE and NR measurement configurations and a UE camping in NR can be configured with both NR and LTE configurations, compared to what the corresponding report were in LTE, where all the content may not be relevant to the target node. In addition, different types of idle/inactive reports may be introduced in the future, e.g. Cell Global Identifier (CGI) report, or other information part of system information of each configured Physical Cell Identity (PCI).

Currently, the network request for early measurements is a simple flag, which if included in the UEInformationRequest or as recently has been agreed in Release 16 in the Resume message, will result in the UE sending all the measurements that the UE has. Adopting such a solution for Release 16, where the measurement results can be considerably larger than in the case of LTE enhancing utilization of Carrier Aggregation (CA) (euCA), can thus be highly inefficient, specifically considering that the network does not have proper information about the link quality when the grant is provided to the UE for Msg5.

Certain aspects of the present disclosure and their embodiments may provide solutions to the aforementioned or other challenges. In some embodiments, when the network requests the UE to transmit the idle/inactive measurement results, the network can indicate that only a subset of the measurement results has to be reported, e.g.:

Cells and/or beams:
  Specific Cells/max number of cells:
    In one example, the network requests the UE to report only measurements associated to cells in the serving frequency (possibly including the serving cell). In another example, the network requests the UE to report only measurements associated to cells in a non-serving frequency. In another example, the network provides a list of cells whose measurements the UE has to report. In another example, the network provides a maximum number of cells (n) the UE can report on. This could be per frequency and/or Radio Access Technology (RAT) or in total. The UE then reports only measurements of the top n cells. In another example, the network provides a threshold (tresh), which can be per frequency and/or cell and/or RAT or applicable to all cells, and the UE reports only cells that have signal quality above the specified threshold. In another example, a combination of the above can be used.

Specific beams/max number of beams:
  In one example, the network requests the UE to report only beam measurements associated to cells in the serving frequency (possibly including the serving cell). In another example, the network requests the UE to report only beam measurements associated to cells in a non-serving frequency. In another example, the network requests the UE to report only beam measurements associated to a list of cells. In another example, the network provides a maximum number of beams (n) the UE could report on, which can be per frequency and/or RAT or in total. The UE then reports only up to n beams per reported cell. In another example, the network provides a threshold (tresh), which can be per frequency or per cell or applicable to all cells, and the UE reports only beams that have signal quality above the specified threshold. In another example, the network provides an indication to report only beam indexes and/or beam signal levels (this can be the same indication for all cells/frequencies, or different values can be indicated per cell/frequency). In another example, a combination of the above can be used.

In another example, a combination of the above can be used, where for some frequencies/cells only cell level limitations are imposed while for others only beam level limitations are imposed, and for some both cell and beam level limitations are imposed.

Specific frequencies:
  For NR, this could also be, e.g., FR1 and/or FR2.
  For LTE and NR, this could a specific list of frequencies.
  The list of frequencies could be the frequencies that the UE should report or a list of frequencies that the UE should not report.

Specific RAT (LTE and/or NR)

Specific measurement quantities per cell
  For example, Reference Signal Received Power (RSRP), Reference Signal Receive Quality (RSRQ), or Signal to Interference plus Noise Ratio (SINR).

Specific measurement quantities per beam
  For example, RSRP, RSRQ, or SINR.

Measurements associated only to a reference signal type
  For example, the network may request the report only for Synchronization Signal Block (SSB) based measurements, only for Channel State Information Reference Signal (CSI-RS) measurements, or for both SSB/CSI-RS measurements.

The request from the network for granular report of early measurements may be done in different manners.

In specific fields that are part of a message such as UEInformationRequest;
  The selected measurements are reported in a response message such as UEInformationResponse;
In specific fields that are part of a message such as RRCResume;
  The selected measurements are reported in a response message such as RRCResumeComplete;
In a Random Access Response (or based on a Medium Access Control (MAC) Control Element (CE) indication);
  The selected measurements are reported in a response message or possibly multiplexed with such as RRCResumeRequest;
In a Random Access Response (or based on a MAC CE indication);
  The selected measurements are reported in a response message or possibly multiplexed with such as RRCResumeRequest;
  That request may also be implicitly done, e.g., based on the grant size or the grant type in the Random Access Response (RAR) where an order to priority is defined for which measurements to include first.
In broadcast signaling via System Information Block (SIB).

Thus, even if the UE has other measurement results than those requested, the UE would only include the requested results.

Once the UE has reported the early measurement results, there could be different solutions to handle the remaining measurements and the ones that have already been reported. The UE could:
  delete only the reported early measurements,
  delete all stored early measurements (even those not reported),
  keep all stored early measurements, or
  perform a combination of the above (e.g., if only beam indexes were reported, the UE can still keep the beam indexes as well as the beam quantities for the reported cells because they may be requested later, while if the beam quantities were reported, the UE deletes the whole beam results for the reported cells).

If the UE does not delete all early measurements when it reports a subset, the network can at a later time request some or all of the remaining measurements.

Embodiments of the present disclosure provide that, instead of reporting all early measurements, the network can request the UE to only report some (idle mode) measurements (e.g., only relevant measurements). This will reduce the message size of the measurement report, allowing, e.g., faster processing and possibly transmission of the message if the UE does not have to segment the reported measurements and send them in separate transport blocks.

Certain embodiments may provide one or more of the following technical advantage(s). One advantage of the solution is that the network can request only the most relevant measurements from the UE in a given message. Especially if a solution based on Msg3 or Msg5 is used, the message size and transmission latency may be a factor to keep the measurement report as small as possible. For example, Msg3 is limited in size, so having to transmit measurements at that point may be problematic. However, having more limited information as early as possible could still be very valuable.

Once the first measurements have been received, the network can request the remaining results to get a more refined measurement report or to use for statistics at a later point where the link quality is well-known and a more accurate grant can be provided to get the remaining results.

First, some initial notes, e.g., on configuration and information to be reported, are beneficial. In the present disclosure, the measurement configuration provided to the UE in RRC_IDLE has not been disclosed in detail and is not part of the core of the embodiments disclosed herein. One may initially assume, as an example, at least the existing solution in Release 15 in LTE where the UE is provided with a list of carriers, either through broadcasted or dedicated signaling, whose measurements to be performed may also be indicated, i.e. RSRP and/or RSRQ. Other configuration may also be present, e.g. validity area, timers, list of cells, etc. Also notice that the fundamental aspect is that, upon resume, the UE has idle/inactive measurements available that may be provided to the network to speed up the setup of CA and/or any form of dual/multi-radio connectivity.

Below, an example of a possible measurement configuration for these early measurements from Technical Specification (TS) 36.331 V15.4.0 is provided:

MeasIdleConfig information element

```
-- ASN1START
MeasIdleConfigSIB-r15 ::= SEQUENCE {
    measIdleCarrierListEUTRA-r15        EUTRA-CarrierList-r15,
    ...
}
MeasIdleConfigDedicated-r15 ::= SEQUENCE {
    measIdleCarrierListEUTRA-r15        EUTRA-CarrierList-r15
```

| MeasIdleConfig information element |
| --- |
| ```
    OPTIONAL, -- Need OR
    measIdleDuration-r15        ENUMERATED {sec10, sec30, sec60,
sec120,
                                sec180, sec240, sec300, spare},
    ...
}
EUTRA-CarrierList-r15 ::= SEQUENCE (SIZE (1..maxFreqIdle-r15)) OF
MeasIdleCarrierEUTRA-r15
MeasIdleCarrierEUTRA-r15::=          SEQUENCE {
    carrierFreq-r15                  ARFCN-ValueEUTRA-r9,
    allowedMeasBandwidth-r15         AllowedMeasBandwidth,
    validityArea-r15                 CellList-r15 OPTIONAL,   -- Need
OR
    measCellList-r15                 CellList-r15 OPTIONAL,   -- Need
OR
    reportQuantities                 ENUMERATED (rsrp, rsrq, both},
    qualityThreshold-r15             SEQUENCE {
        idleRSRP-Threshold-r15           RSRP-Range
OPTIONAL, -- Need OR
        idleRSRQ-Threshold-r15           RSRQ-Range-r13
OPTIONAL -- Need OR
    }                                OPTIONAL,  --
Need OR
    ...
}
CellList-r15 ::=   SEQUENCE SIZE (1.. maxCellMeasIdle-r15))
OF PhysCellIdRange
-- ASN1STOP
``` |

In the present disclosure, the exact measurements to be reported to the UE during the transition to RRC_CONNECTED has not been disclosed in detail and is not part of the core of the embodiments described herein. One may assume, simply as an example, at least the existing solution in Release 15 in LTE, as shown below:

```
UEInformationResponse-v1530-IEs ::= SEQUENCE {
    measResultListIdle-r15           MeasResultListIdle-r15
    OPTIONAL,
    flightPathInfoReport-r15         FlightPathintoReport-r15
    OPTIONAL, nonCriticalExtension           SEQUENCE { }
    OPTIONAL
}
MeasResultListIdle-r15   ::= SEQUENCE (SIZE
(1..maxIdleMeasCarriers-r15)) OF MeasResultIdle-r15
MeasResultIdle-r15 ::= SEQUENCE {
    measResultServingCell-r15
        rsrpResult-r15               SEQUENCE {
        rsrqResult-r15               RSRP-Range,
                                     RSRQ-Range-r13
    },
    measResultNeighCells-r15         CHOICE {
        measResultIdleListEUTRA-r15          MeasResultIdleListEUTRA-
r15,
        ...
    }                                OPTIONAL,
    ...
}
MeasResultIdleListEUTRA-r15 ::= SEQUENCE (SIZE
(1..maxCellMeasIdle-r15)) OF MeasResultIdleEUTRA-r15
MeasResultIdleEUTRA-r15 ::=          SEQUENCE {
    carrierFreq-r15                  ARFCN-ValueEUTRA-r9,
    physCellId-r15                   PhysCellId,
    measResult-r15                   SEQUENCE {
        rsrpResult-r15                   RSRP-Range,
        rsrqResult-r15                   RSRQ-Range-r13
    },
    ...
}
```

Another possible measurement configuration for these early measurements is related to beam information in early measurements, as provided below as another example:

| MeasIdleConfig information element |
| --- |

```
-- ASN1START
MeasIdleConfigSIB-r15 ::= SEQUENCE {
  measIdleCarrierListEUTRA-r15 EUTRA-CarrierList-r15,
  ...
}
MeasIdleInactiveConfigDedicated-r16 ::= SEQUENCE {
  measIdleCarrierListEUTRA-r16 EUTRA-CarrierList-r16
    OPTIONAL, -- Need OR
  measIdleCarrierListNR-r16           NR-CarrierList-r16
    OPTIONAL, -- Need OR
  measIdleDuration-r16                ENUMERATED {sec10, sec30, sec60, sec120,
                                         sec180, sec240, sec300, spare},
  ...
  quantityConfig                      QuantityConfig
OPTIONAL,
}
measIdleCarrierListNR-r16::= SEQUENCE (SIZE (1..maxFreqIdle-r16))
OF MeasIdleCarrierNR-r16
MeasIdleCarrierNR-r16::=             SEQUENCE {
// NR related configuration for early measurements
  ssbFrequency                       ARFCN-ValueNR
OPTIONAL,   -- Cond SSBorAssociatedSSB
  ssbSubcarrierSpacing               SubcarrierSpacing
OPTIONAL,   -- Cond SSBorAssociatedSSB
  smtc1                              SSB-MTC
OPTIONAL,   -- Cond SSBorAssociatedSSB
  smtc2                              SSB-MTC2
OPTIONAL,   -- Cond IntraFreqConnected
  refFreqCSI-RS                      ARFCN-ValueNR
OPTIONAL,   -- Cond CSI-RS
  absThreshSS-BlocksConsolidation    ThresholdNR
OPTIONAL,   -- Need R
  absThreshCSI-RS-Consolidation      ThresholdNR
OPTIONAL,   -- Need R
  nrofSS-BlocksToAverage             INTEGER (2..maxNrofSS-BlocksToAverage)
                                       OPTIONAL, -- Need R
  nrofCSI-RS-ResourcesToAverage      INTEGER (2..maxNrofCSI-RS-ResourcesToAverage)
                                       OPTIONAL, -- Need R
  quantityConfigIndex                INTEGER
(1..maxNrofQuantityConfig),
  freqBandIndicatorNR-v1530          FreqBandIndicatorNR
OPTIONAL, -- Need R
  quantityConfigIndex                INTEGER
(1..maxNrofQuantityConfig),
  refFreqCSI-RS                      ARFCN-ValueNR
OPTIONAL,   -- Cond CSI-RS
  referenceSignalConfig              ReferenceSignalConfig,
// Beam Measurement configuration
  reportQuantityRS-Indexes
MeasReportQuantity                              OPTIONAL, -- Need R
  maxNrofRS-IndexesToReport               INTEGER
(1..maxNrofIndexesToReport)       OPTIONAL, -- Need R
  includeBeamMeasurements                 BOOLEAN,
// Other early measurement configuration
  validityArea-r16                   CellList-r16 OPTIONAL, -- Need OR
  measCellListNR-r16                 CellListNR-r16
    OPTIONAL, -- Need OR
  reportQuantities                   ENUMERATED {rsrp, rsrq, both},
  qualityThresholdNR-r16               SEQUENCE {
    idleInactiveRSRP-Threshold-r16     RSRP-Range
    OPTIONAL, -- Need OR
    idleInactiveRSRQ-Threshold-r16     RSRQ-Range
    OPTIONAL   -- Need OR
    idleInactiveSINR-Threshold-r16     SINR-Range
    OPTIONAL   -- Need OR
  }                                  OPTIONAL, -- Need OR
  ...
}
```

-continued

| MeasIdleConfig information element |
|---|

```
CellListNR-r16 ::=    SEQUENCE (SIZE (1.. maxCellMeasIdleNR-r16))
OF PCI-RangeIndexList
PCI-RangeElement ::=                SEQUENCE {
    pci-RangeIndex                      PCI-RangeIndex,
    pci-Range                           PCI-Range
}
PCI-RangeIndex ::=                  INTEGER (1..maxNrofPCI-
Ranges)
PCI-Range ::=                       SEQUENCE {
    start                               PhysCellId,
    range                               ENUMERATED {n4, n8, n12,
n16, n24, n32, n48, n64, n84,
                                            n96, n128,
n168, n252, n504, n1008,spare1} OPTIONAL    -- Need S
}
// for field descriptions, see MeasObjectNR
ReferenceSignalConfig::=            SEQUENCE {
    ssb-ConfigMobility                  SSB-ConfigMobility
OPTIONAL,   -- Need M
    csi-rs-ResourceConfigMobility       SetupRelease { CSI-RS-
ResourceConfigMobility }                OPTIONAL    -- Need M
}
SSB-ConfigMobility::=               SEQUENCE {
    ssb-ToMeasure                       SetupRelease { SSB-
ToMeasure }                             OPTIONAL,   -- Need M
    deriveSSB-IndexFromCell             BOOLEAN,
    ss-RSSI-Measurement                 SS-RSSI-
Measurement                            OPTIONAL,  --
Need M
    ...
}
EUTRA-CarrierList-r16 ::= SEQUENCE (SIZE (1..maxFreqIdle-r16) ) OF
MeasIdleCarrierEUTRA-r16
MeasIdleCarrierEUTRA-r15::=         SEQUENCE {
    carrierFreq-r15                     ARFCN-ValueEUTRA-r9,
    allowedMeasBandwidth-r15            AllowedMeasBandwidth,
    validityArea-r15                    CellList-r15    OPTIONAL,   --
Need OR
    measCellList-r15                    CellList-r15    OPTIONAL,   --
Need OR
    reportQuantities                    ENUMERATED {rsrp, rsrq, both},
    qualityThreshold-r15                SEQUENCE {
        idleRSRP-Threshold-r15              RSRP-Range
OPTIONAL,   -- Need OR
        idleRSRQ-Threshold-r15              RSRQ-Range-r13
OPTIONAL    -- Need OR
    }                                       OPTIONAL,  --
Need OR
    ...
}
CellList-r15 ::=   SEQUENCE (SIZE (1.. maxCellMeasIdle-r15))
OF PhysCellIdRange
-- ASN1STOP
```

Embodiments of a method at a wireless terminal (e.g., a UE) for measurement reporting during a transition from a dormant state (also referred to herein as a dormant mode) to a connected state are disclosed herein. In the context of the present disclosure, one should interpret dormant state as a protocol state (like a Radio Resource Control (RRC) state) where the UE performs actions optimized for power savings, such as, e.g.:

RRC_IDLE without stored Access Stratum (AS) context;
RRC_IDLE with stored AS context;
RRC_INACTIVE.

In some embodiments, the method comprises reporting of measurements performed in a dormant state when the UE is trying to resume. As such, it is beneficial to note that the method covers the case where the UE is suspended in one RAT (e.g., RRC_CONNECTED to RRC_IDLE or RRC_I-NACTIVE) and tries to resume in another RAT (e.g., RRC_INACTIVE or RRC_IDLE to RRC_CONNECTED), such as, e.g., in the following cases:

UE is suspended in NR and resumes in LTE;
UE is suspended in LTE and resumes in NR;
UE is suspended in NR and resumes in NR;
UE is suspended in LTE and resumes in LTE;
Or, in more general terms, UE is suspended in RAT-1 and resumes in RAT-2, where RAT-1 and RAT-2 may be the same or different RATs.

In the following, embodiments are described in which the solution is implemented for different signaling solutions for the reporting of early measurements. These different signaling solutions include:

Msg3 solution;
Msg5 solution;
UEInformationRequest/Response solution.

Figure 8:
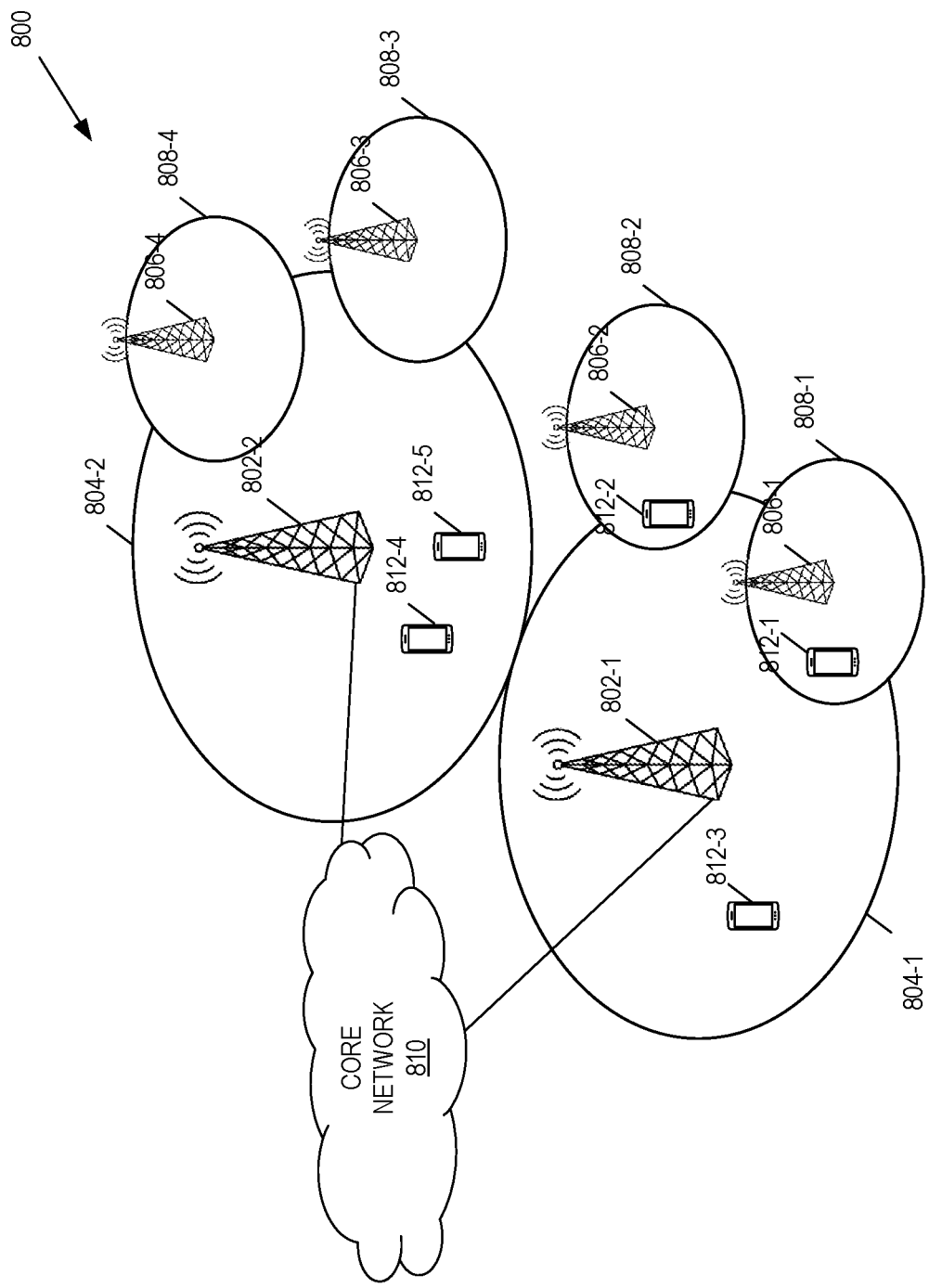
FIG. 8 illustrates one example of a cellular communications network in which embodiments of the present disclosure may be implemented.

In this regard, FIG. 8 illustrates one example of a cellular communications network 800 in which embodiments of the present disclosure may be implemented. In the embodiments described herein, the cellular communications network 800 is a 5G NR network. In this example, the cellular communications network 800 includes base stations 802-1 and 802-2, which in 5G NR are referred to as gNBs, controlling corresponding (macro) cells 804-1 and 804-2. The base stations 802-1 and 802-2 are generally referred to herein collectively as base stations 802 and individually as base station 802. Likewise, the (macro) cells 804-1 and 804-2 are generally referred to herein collectively as (macro) cells 804 and individually as (macro) cell 804. The cellular communications network 800 may also include a number of low power nodes 806-1 through 806-4 controlling corresponding small cells 808-1 through 808-4. The low power nodes 806-1 through 806-4 can be small base stations (such as pico or femto base stations) or Remote Radio Heads (RRHs), or the like. Notably, while not illustrated, one or more of the small cells 808-1 through 808-4 may alternatively be provided by the base stations 802. The low power nodes 806-1 through 806-4 are generally referred to herein collectively as low power nodes 806 and individually as low power node 806. Likewise, the small cells 808-1 through 808-4 are generally referred to herein collectively as small cells 808 and individually as small cell 808. The base stations 802 (and optionally the low power nodes 806) are connected to a core network 810.

The base stations 802 and the low power nodes 806 provide service to wireless devices 812-1 through 812-5 in the corresponding cells 804 and 808. The wireless devices 812-1 through 812-5 are generally referred to herein collectively as wireless devices 812 and individually as wireless device 812. The wireless devices 812 are also sometimes referred to herein as UEs.

Figure 9:
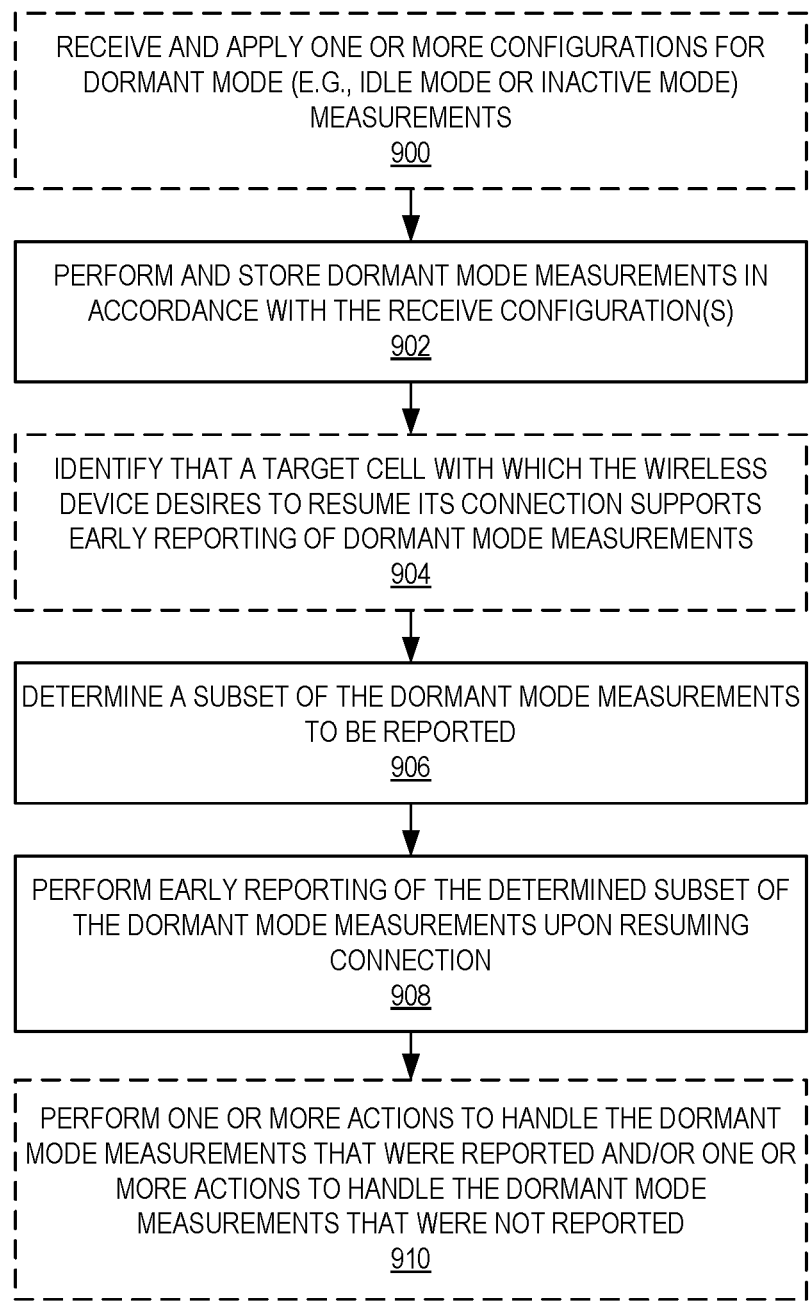
FIG. 9 is a flow chart that illustrates the operation of a wireless device to provide early reporting of a subset of dormant mode measurements upon resuming a Radio Resource Control (RRC) connection in accordance with embodiments of the present disclosure.

Embodiments of a method performed by (i.e., executed by) a wireless device (e.g., a UE) for measurement reporting during a transition from a dormant state (e.g., RRC_INACTIVE or RRC_IDLE with or without context information) to a connected state (e.g., RRC_CONNECTED) (e.g., to assist the network to perform a UE reconfiguration e.g. handovers, reconfiguration with synchronization, Secondary Cell Group (SCG) addition/removal/modification, Secondary Cell (SCell) addition/removal/modification, etc.)) are disclosed herein. In some embodiments, as illustrated in FIG. 9, the method performed by a wireless device (e.g., a wireless device 812) comprises the following steps.

Step 900 (optional): The wireless device receives and applies configurations for dormant mode measurements (also referred to herein as idle/inactive mode measurements). These configurations may be from at least one of: a first cell (source cell) upon entering dormant state in an RRC message (e.g., RRCRelease or RRCConnectionRelease), and a second cell through broadcasted signaling (e.g., SIB5 in LTE or SIB4 in NR).

Step 902: The wireless device performs and stores dormant mode measurements according to the received dormant mode measurement configurations.

Step 904 (optional): The wireless device identifies that a third cell (the target cell) in which the UE is camping and where the UE is trying to resume a connection supports early measurements performed in idle and/or inactive state to be reported as described in the method. Note that the first, second, and third cells may be the same cell, two different cells (in any combination), or three different cells.

Figure 10:
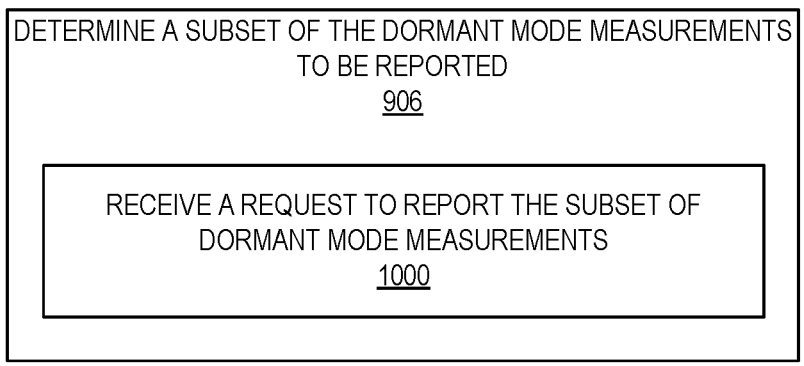
FIG. 10 illustrates one of the steps of FIG. 9 in more detail, in accordance with some embodiments of the present disclosure.

Step 906: The wireless device determines a subset of the dormant state measurements to be reported upon resuming a connection. This may be done in accordance with any of the embodiments described herein. For example, in some embodiments, the network can indicate that only a subset of the results has to be reported. This is illustrated in FIG. 10, which shows that, in some embodiments, the step of determining the subset of the dormant state measurements to be reported upon resuming a connection includes receiving a request from a network node, the request being a request for reporting of the subset of dormant state measurements (1000). As discussed below, this request may be included in, for example, system information, a RAR message (i.e., in response to a random access request sent by the wireless device for a resume), an RRC Resume message, or in a UEInformationRequest.

For example, the network can indicate that the wireless device is to report only those measurements associated with a particular cell(s) and/or a particular beam(s). In other words, the subset of the dormant mode measurements to be reported is limited to those measurements associated with a particular cell(s) and/or particular beam(s). In regard to specific cells/maximum number of cells, in one example, the network requests the wireless device to report only measurements associated to cells in the serving frequency (possibly including the serving cell). In another example, the network requests the wireless device to report only measurements associated to cells in a non-serving frequency. In another example, the network provides a list of cells whose measurements the wireless device has to report. In another example, the network provides a maximum number of cells (n) the wireless device could report on, which could be per frequency and/or RAT or in total. The wireless device then reports only measurements of the top n cells. In another example, the network provides a threshold (tresh), which can be per frequency and/or cell and/or RAT or applicable to all cells, and the wireless device reports only cells that have signal quality above the specified threshold. The network can indicate that the wireless device is to report a combination of the above.

In regard to specific beams/maximum number of beams, in one example, the network requests the wireless device to report only beam measurements associated to cells in the serving frequency (possibly including the serving cell). In another example, the network requests the wireless device to report only beam measurements associated to cells in a non-serving frequency. In another example, the network requests the wireless device to report only beam measurements associated to a list of cells. In another example, the network provides a maximum number of beams (n) the wireless device could report on, which could be per frequency and/or RAT or in total. The wireless device then reports only up to n beams per reported cell. In another example, the network provide a threshold (tresh), which can be per frequency or per cell or applicable to all cells, and the wireless device reports only beams that have signal quality above the specified threshold. In another example, the network provides an indication to report only beam indexes and/or beam signal levels. This can be the same indication for all cells/frequencies, or different values can be indicated per cell/frequency. The network can indicate that the wireless device is to report a combination of the above.

The network can indicate that the wireless device is to report a combination of the above examples related to specific cells/maximum number of cells and specific beams/maximum number of beams, where for some frequencies/cells only cell level limitations are imposed while for others only beam level limitations are imposed, and for some both cell and beam level limitations are imposed.

The network can indicate that the wireless device is to report only those measurements associated with a specific frequency(ies). In other words, the subset of the dormant mode measurements to be reported is limited to those measurements associated with a specific frequency(ies). For NR, this could also be, e.g., FR1 and/or FR2. For LTE and NR, this could a specific list of frequencies. The list of frequencies could be the frequencies that the wireless device should report or a list of frequencies that the wireless device should not report.

The network can indicate that the wireless device is to report only those measurements associated with a specific RAT (LTE and/or NR). In other words, the subset of the dormant mode measurements to be reported is limited to those measurements associated with a specific RAT.

The network can indicate that the wireless device is to report only those measurements associated with specific measurement quantities per cell. For example, these measurement quantities may be RSRP, RSRQ, or SINR. In other words, the subset of the dormant mode measurements to be reported is limited to those measurements associated with a specific measurement quantity(ies) per cell.

The network can indicate that the wireless device is to report only those measurements associated with specific measurement quantities per beam. For example, these measurement quantities may be RSRP, RSRQ, or SINR. In other words, the subset of the dormant mode measurements to be reported is limited to those measurements associated with a specific measurement quantity(ies) per beam.

The network can indicate that the wireless device is to report only those measurements associated only to a reference signal type. In other words, the subset of the dormant mode measurements to be reported is limited to those measurements associated to a reference signal type. For example, the network may request the report only for SSB based measurements, only for CSI-RS measurements, or for both SSB/CSI-RS measurements.

Further, in some embodiments, the request from the network for a granular report of early measurements may be done in different manners. The request from the network for the granular report of early measurements may be done in specific fields that are part of a message such as UEInformationRequest The selected measurements are reported in a response message such as UEInformationResponse. The request from the network for the granular report of early measurements may be done in specific fields that are part of a message such as RRCResume. The selected measurements are reported in a response message such as RRCResumeComplete. The request from the network for the granular report of early measurements may be done in a RAR (or based on a MAC CE indication). The selected measurements are reported in a response message or possibly multiplexed with a message such as RRCResumeRequest The request from the network for the granular report of early measurements may be done in a RAR (or based on a MAC CE indication). The selected measurements are reported in a response message or possibly multiplexed with a message such as RRCResumeRequest That request may also be implicitly done, e.g., based on the grant size or the grant type in the RAR where an order to priority is defined for which measurements to include first. The request from the network for the granular report of early measurements may be done in broadcast signaling via SIB.

Thus, even if the wireless device has other dormant mode measurement results than those requested, the wireless device would include only the requested results in the subset to be reported.

Step 908: The wireless device performs early reporting of the determined subset of the dormant mode measurements upon resuming the connection. As described below in detail, this early reporting may be performed using, e.g., a Msg3 solution, a Msg5 solution, or a UEInformationRequest/Response solution.

Step 910 (optional): The wireless device performs one or more actions to handle the dormant mode measurements that were reported and/or one or more actions to handle the dormant mode measurements that were not reported. More specifically, once the wireless device has reported the early measurement results, there could be different solutions to handle the remaining measurements and/or the ones that have already been reported. The wireless device could, e.g., delete only the reported early measurements, delete all stored early measurements (even those not reported), keep all stored early measurements, or perform a combination thereof. For example, if only beam indexes were reported, the wireless device can still keep the beam indexes as well as the beam quantities for the reported cells because they may be requested later; while if the beam quantities were reported, the wireless device deletes the whole beam results for the reported cells. If the wireless device does not delete all early measurements when it reports the subset, the network can at a later time request some or all of the remaining measurements.

Figure 11:
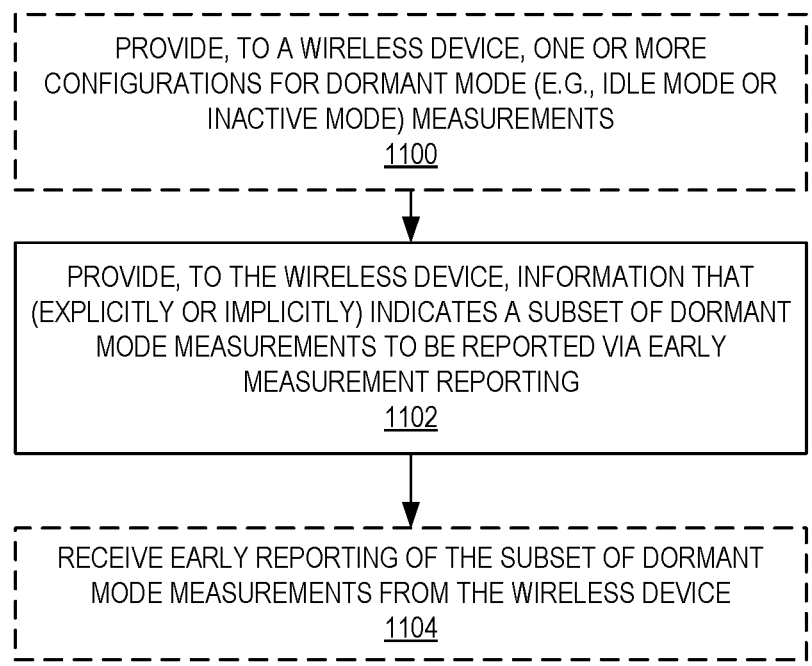
FIG. 11 is a flow chart that illustrates the operation of a network node for early reporting of a subset of dormant mode measurements in accordance with embodiments of the present disclosure.

Embodiments of a method performed by (i.e., executed by) a network node (e.g., a base station such as, e.g., an eNB or gNB) for measurement reporting during a wireless device's transition from a dormant state (e.g., RRC_INACTIVE or RRC_IDLE with or without context information) to a connected state (e.g., RRC_CONNECTED) (e.g., to assist the network to perform a wireless device reconfiguration, e.g. handovers, reconfiguration with synchronization, SCG addition/removal/modification, SCell addition/removal/modification, etc.)) are also disclosed herein. In some embodiments, as illustrated in FIG. 11 the method performed by a network node (e.g., a base station 802) comprises the following steps.

Step 1100 (optional): The network node provides a wireless device with configurations for dormant mode measurements from at least one of: a first cell (source cell) upon entering dormant state in an RRC message (e.g., RRCRelease or RRCConnectionRelease), a second cell through broadcasted signaling (e.g., SIB5 in LTE or SIB4 in NR).

Step 1102: The network node provides, to the wireless device, information that indicates a subset of dormant mode measurements to be reported by the wireless device via early measurement reporting. For example, in some embodiments, the network node can indicate that only a subset of the results has to be reported by the wireless device, e.g.: report only those measurements associated with a particular cell(s) and/or a particular beam(s), report only those measurements associated with a specific frequency(ies), report only those measurements associated with a specific RAT (LTE and/or NR), report only those measurements associated with specific measurement quantities per cell, report only those measurements associated with specific measurement quantities per beam, or report only those measurements associated only to a reference signal type. Each of these examples is described in more detail below.

In regard to reporting only those measurements associated with a particular cell(s) and/or a particular beam(s), the network node can indicate that only a subset of the results has to be reported by the wireless device for specific cells/maximum number of cells. In one example, the network node requests the wireless device to report only measurements associated to cells in the serving frequency (possibly including the serving cell). In another example, the network node requests the wireless device to report only measurements associated to cells in a non-serving frequency. In another example, the network node provides a list of cells whose measurements the wireless device has to report. In another example, the network node provides a maximum number of cells (n) the wireless device could report on (this could be per frequency and/or RAT or in total), and the wireless device reports only measurements of the top n cells. In another example, the network node could provide a threshold (tresh), which can be per frequency and/or cell and/or RAT or applicable to all cells, and the wireless device reports only cells that have signal quality above the specified threshold. The network node can indicate that only a subset of the results has to be reported by the wireless device for a combination of the above.

In regard to reporting only those measurements associated with a particular cell(s) and/or a particular beam(s), the network node can indicate that only a subset of the results has to be reported by the wireless device for specific beams/maximum number of beams. In one example, the network node requests the wireless device to report only beam measurements associated to cells in the serving frequency (possibly including the serving cell). In another example, the network node requests the wireless device to report only beam measurements associated to cells in a non-serving frequency. In another example, the network node requests the wireless device to report only beam measurements associated to a list of cells. In another example, the network node provides a maximum number of beams (n) the wireless device could report on (this could be per frequency and/or RAT or in total), and the wireless device reports only up to n beams per reported cell. In another example, the network node provides a threshold (tresh), which can be per frequency or per cell or applicable to all cells, and the wireless device reports only beams that have signal quality above the specified threshold. In another example, the network node provides an indication to report only beam indexes and/or beam signal levels. This can be the same indication for all cells/frequencies, or different values can be indicated per cell/frequency. The network node can indicate that only a subset of the results has to be reported by the wireless device for a combination of the above.

In regard to reporting only those measurements associated with a particular cell(s) and/or a particular beam(s), the network node can indicate that only a subset of the results has to be reported by the wireless device for a combination of the above, where for some frequencies/cells only cell level limitations are imposed while for others only beam level limitations are imposed, and for some both cell and beam level limitations are imposed.

In regard to reporting only those measurements associated with a specific frequency(ies), the network node can indicate that only a subset of the results has to be reported by the wireless device for only those measurements associated with a specific frequency(ies). For NR, this could also be, e.g., FR1 and/or FR2. For LTE and NR, this could a specific list of frequencies. The list of frequencies could be the frequencies that the wireless device should report or a list of frequencies that the wireless device should not report.

In regard to reporting only those measurements associated with a specific RAT (LTE and/or NR), the network node can indicate that only a subset of the results has to be reported by the wireless device for only those measurements associated with a specific RAT (LTE and/or NR).

In regard to reporting only those measurements associated with a specific measurement quantities per cell, the network node can indicate that only a subset of the results has to be reported by the wireless device for only those measurements associated with a specific measurement quantities per cell. For example, the network node can indicate that only a subset of the results has to be reported by the wireless device for only those measurements associated with RSRP, RSRQ, or SINR.

In regard to reporting only those measurements associated with a specific measurement quantities per beam, the network node can indicate that only a subset of the results has to be reported by the wireless device for only those measurements associated with a specific measurement quantities per beam. For example, the network node can indicate that only a subset of the results has to be reported by the wireless device for only those measurements associated with RSRP, RSRQ, or SINR.

In regard to reporting only those measurements associated only to a reference signal type, the network node can indicate that only a subset of the results has to be reported by the wireless device for only those measurements associated only to a reference signal type. For example, the network node may request the report only for SSB based measurements, only for CSI-RS measurements, or for both SSB/CSI-RS measurements.

Further, in some embodiments, the indication provided by the network node in step 1102 may be done in different manners. The indication provided by the network node in step 1102 may be done in specific fields that are part of a message such as UEInformationRequest The selected measurements are reported in a response message such as UEInformationResponse. The indication provided by the network node in step 1102 may be done in specific fields that are part of a message such as RRCResume. The selected measurements are reported in a response message such as RRCResumeComplete. The indication provided by the network node in step 1102 may be done in a RAR (or based on a MAC CE indication). The selected measurements are reported in a response message or possibly multiplexed with a message such as RRCResumeRequest The indication provided by the network node in step 1102 may be done in a RAR (or based on a MAC CE indication). The selected measurements are reported in a response message or possibly multiplexed with a message such as RRCResumeRequest That request may also be implicitly done, e.g., based on the grant size or the grant type in the RAR where an order to priority is defined for which measurements to include first. The indication provided by the network node in step 1102 may be done in broadcast signaling via SIB. Thus, even if the wireless device has other dormant mode measurement results than those requested, the wireless device would include only the requested results in the subset to be reported.

Step 1104 (Optional): The network node receives dormant mode measurements reported by the wireless device in accordance with the indicated early reporting scheme. As described below in detail, this early reporting may be performed using, e.g., a Msg3 solution, a Msg5 solution, or a UEInformationRequest/Response solution.

Msg3 Solution

In one embodiment, a solution to report early measurements in Msg3 (i.e., RRCResumeRequest) is introduced. Since Msg3 is strictly size limited, the method comprises only part of the measurement results being included.

Since the target network node for RRC resume is not aware of what dormant measurement configurations the UE has because the UE Inactive AS Context will be retrieved only after Msg3 is received by the network node, the network node may opportunistically request only a subset of the measurements that are relevant (e.g., frequencies/cells in the same RAT that the target network node can configure CA, frequencies/cells in the same RAT the target network node can configure Dual Connectivity (DC), etc.).

The request for a particular result or a subset of the possibly available measurements could be explicit. One way of doing so is by the target network node indicating via SIB broadcasting what information that it wants the UE to report or not report. Another way is that, in the RAR, the target network node sends the request for a particular result or a subset of the possibly available measurements to the UE before Msg3 can be sent by the UE. This variant could be implemented in the MAC specifications by adding report-specific uplink grants in the RAR to indicate to the UE what exact early measurements types shall be sent, if available, or, alternatively, which ones shall not be included (which could consume less bits to indicate).

This is shown below in a possible implementation in TS 38.321:

6.2.3 MAC payload for Random Access Response

Figure 6:
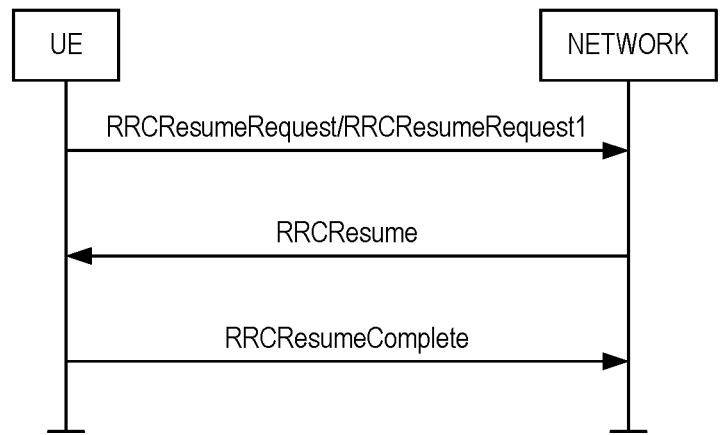
FIG. 6 is a reproduction of FIG. 5.3.13.1-1 of Section 5.3.15 of Third Generation Partnership Project (3GPP) Technical Specification (TS) 38.331.
Figure 7:
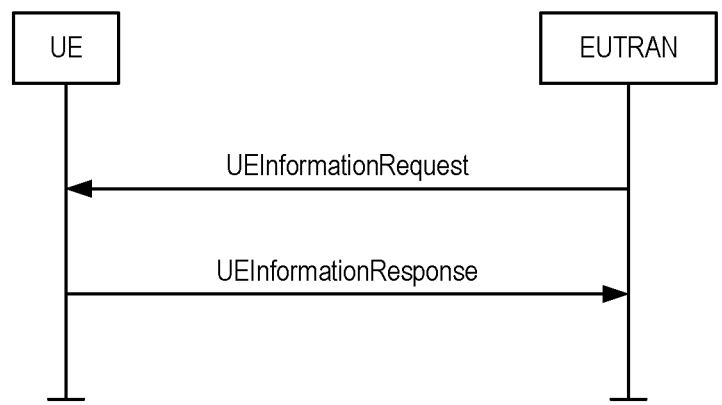
FIG. 7 illustrates the conventional UE Information Request/Response procedure defined by 3GPP, which can be used by a UE for reporting of dormant state measurements.

The MAC RAR is of fixed size as depicted in FIG. 6.2.3-1, and consists of the following fields:

R: Reserved bit, set to "0";

Timing Advance Command: The Timing Advance Command field indicates the index value $T_A$ used to control the amount of timing adjustment that the MAC entity has to apply in TS 38.213 [6]. The size of the Timing Advance Command field is 12 bits;

UL Grant: The Uplink Grant field indicates the resources to be used on the uplink in TS 38.213 [6], or for the different types of early measurement reporting during transition to connected (possibly with amount of reported information). The size of the UL Grant field is 27 bits;

Temporary C-RNTI: The Temporary C-RNTI field indicates the temporary identity that is used by the MAC entity during Random Access. The size of the Temporary C-RNTI field is 16 bits.

The MAC RAR is octet aligned.

. . .

In the explicit case, the MAC payload for RAR message may contain an indication in a reserved bit. That may be implemented as follows:

6.2.3 MAC Payload for Random Access Response

The MAC RAR is of fixed size as depicted in FIG. 6.2.3-1, and consists of the following fields:

R: Reserved bit, set to "0"; For UEs supporting early measurement reporting in state transitions, this bit is set to "1" to indicate that an UL Grant in Random Access Response is for Early Measurement Reporting e.g. with RRCResumeRequest.

Timing Advance Command: The Timing Advance Command field indicates the index value $T_A$ used to control the amount of timing adjustment that the MAC entity has to apply in TS 38.213 [6]. The size of the Timing Advance Command field is 12 bits;

UL Grant: The Uplink Grant field indicates the resources to be used on the uplink in TS 38.213 [6]. The size of the UL Grant field is 27 bits;

Temporary C-RNTI: The Temporary C-RNTI field indicates the temporary identity that is used by the MAC entity during Random Access. The size of the Temporary C-RNTI field is 16 bits.

The MAC RAR is octet aligned.

Figure 12:
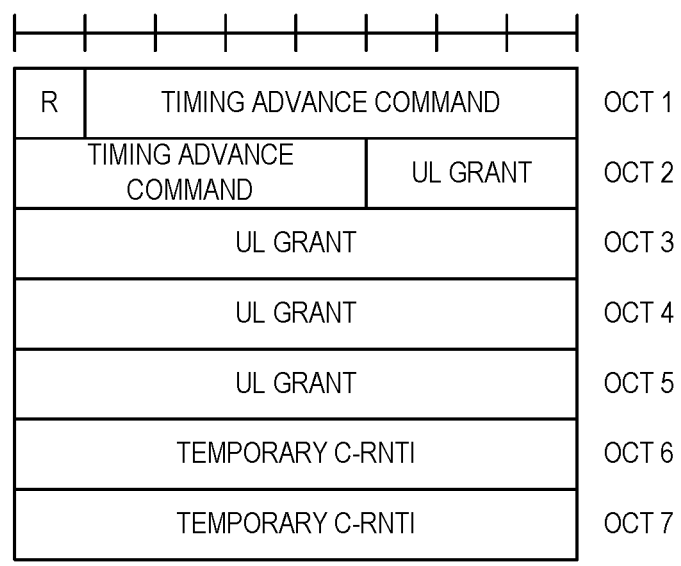
FIG. 12 illustrates a Medium Access Control (MAC) Random Access Response (RAR) that includes information that requests early reporting of a subset of dormant mode measurements from a UE in accordance with one example embodiment of the present disclosure.

See FIG. 12 of the Present Disclosure

FIG. 6.2.3-1: MAC RAR

In a different implementation, some of the initial bits in the uplink grant could be used to indicate which results are to be reported if available, so there may be some kind of bit map between these first X bits and what is to be reported.

In yet another implementation, the UE relies on MAC CEs to get a command to what needs to be reported.

Alternatively, the request could be implicit, where the network node provides the UE with an uplink grant sufficient to report part of the early measurement results. The UE would then include available measurement results in order of priority (either configured, e.g. dedicated, via broadcasted signaling, or via specified behavior) for what to include in the early measurement report based on the size of the uplink grant. For example, cell measurements may have first priority over beam measurements. In another example, RSRP measurements may have second priority.

For instance, if the uplink grant can only fit the results for a single cell, the UE reports the best cell. If the uplink grant is larger, the UE could include results for multiple cells, or cells and beams, etc.

An alternative may rely on the measurements being multiplexed with Msg3, but transmitted in a separate message.

Msg5 Solution

In one embodiment, a solution to report early measurements in Msg5 (i.e., RRCResumeComplete message) is introduced. In the Msg5 solution (include early measurements in the RRCResumeComplete message), the network node can indicate in the RRCResume message what measurement results are required and the UE would only include these measurements.

This could be implemented as, e.g.:

| RRCResume message | |
|---|---|
| -- ASN1START | |
| -- TAG-RRCRESUME-START | |
| RRCResume ::= | SEQUENCE { |
| rrc-TransactionIdentifier | RRC-TransactionIdentifier, |
| criticalExtensions | CHOICE { |
| rrcResume | RRCResume-IEs, |
| criticalExtensionsFuture | SEQUENCE { } |
| } | |
| } | |
| RRCResume-IEs ::= | SEQUENCE { |
| radioBearerConfig | RadioBearerConfig |
| OPTIONAL, -- Need M | |
| masterCellGroup | OCTET STRING (CONTAINING |
| CellGroupConfig) | OPTIONAL, -- Need M |
| measConfig | MeasConfig |
| OPTIONAL, -- Need M | |
| fullConfig | ENUMERATED {true} |
| OPTIONAL, -- Need N | |
| lateNonCriticalExtension | OCTET STRING |
| OPTIONAL, | |
| nonCriticalExtension | RRCResume-v15xy-IEs |

-continued

| RRCResume message | |
|---|---|
| OPTIONAL | |
| } | |
| RRCResume-v15xy-IEs ::= | SEQUENCE { |
| radioBearerConfig2 | OCTET STRING (CONTAINING |
| RadioBearerConfig) | OPTIONAL, -- Need M |
| sk-Counter | SK-Counter |
| OPTIONAL, | |
| nonCriticalExtension | RRCResume-v16xy-IEs |
| OPTIONAL | |
| } | |
| RRCResume-v16xy-IEs ::= | SEQUENCE { |
| earlyMeasurementRequest | EarlyMeasurementRequest |
| OPTIONAL, -- Need N | |
| nonCriticalExtension | SEQUENCE{ } |
| OPTIONAL | |
| } | |
| EarlyMeasurementRequest ::= | CHOICE { |
| fullReport | ENUMERATED {true}, |
| partialReport | SEQUENCE { |
| nrofBestCells | |
| INTEGER{1..maxNrofCells} | |
| OPTIONAL, | |
| frequencyToReportNR | |
| SEQUENCE{1..maxNrofCarriers} OF ARFCN-ValueNR | |
| OPTIONAL, | |
| frequencyToReportEUTRA | |
| SEQUENCE{1..maxNrofCarriers} OF ARFCN-ValueEUTRA | |
| OPTIONAL, | |
| cellsToReportNR | |
| SEQUENCE{1..maxNrofCells} OF PhysCellId | |
| OPTIONAL, | |
| cellsToReportEUTRA | |
| SEQUENCE{1..maxNrofCells} OF EUTRA-PhysCellId | |
| OPTIONAL, | |
| beamsToReport | |
| SEQUENCE{1..maxNrofBeams} OF SSB-Index | |
| OPTIONAL, | |
| nrofBestBeams | |
| INTEGER{1..maxNrofBeams} | |
| OPTIONAL, | |
| reportEUTRA | ENUMERATED {true} |
| OPTIONAL, | |
| reportNR | ENUMERATED {true} |
| OPTIONAL, | |
| reportQuantity | ENUMERATED |
| {RSRP,RSRQ, SINR} | |
| OPTIONAL | |
| } | |
| }, | |
| -- TAG-RRCRESUME-STOP | |
| -- ASN1STOP | |

In addition, the report request could contain indications to report specific Bandwidth Parts (BWPs) or specific reference signals, e.g. CSI-RS or SSB.

When the UE receives the early measurement report request, it includes only the objects and quantities requested by the network node in the early measurement report.

Once the UE has sent the early measurement report and received acknowledgement from the network node, the UE can:

Delete (also referred to as "release") all reported measurement quantities and results, the remaining results could be requested by the network at a later point.

Delete (also referred to as "release") all early measurement results, including those which haven't been reported to the network node.

Keep all early measurement results, including those which have already been reported to the network node.

The network node could also include an indication in the early measurement request indicating how the UE should handle the results after reporting a subset of the results.

Also in this, the target network node can indicate via SIB broadcasting what information that it wants the UE to report or not report (i.e., the Msg4 could just include the flag to report or not, while the details of what to report or not is broadcasted in the SIB).

UEInformationRequest/Response Solution

In another embodiment, the UEInformationRequest message is extended to include a granular request for early measurements, similar to the embodiment for the Msg5 solution, i.e. listing which measurements the UE shall report.

Examples of Network Decisions

The decision at the network node to include or exclude possibly available measurements may be based on different criteria. In one example, the decision is based on the network node's own network capabilities in terms of setting up CA or DC with certain band combinations or capabilities in terms or inter-frequency handovers. Since the network node is the serving node (e.g., gNB where the UE AS Context is located) that configured early measurements, the measurements to include or exclude might have been configured based on the UE's capability and/or its own node capabilities. Hence, upon resume or connection establishment, some of these stored measurements (e.g., for specific carriers) may not be useful for a particular target cell/node or frequency. Hence, the network node may decide to only request measurements for a subset of frequencies.

In another case, the network node may decide to request the UE to only include cell measurements, i.e. no beam measurement information. In connected mode, beam measurement information (e.g., RSRP/RSRQ/SINR for good beams in triggering and serving cells) may be used, for example, as input by a target cell to limit the amount of contention-free random access resources or to have better understanding on the stability of the cell (more stable coverage could mean more beams being detected with good quality/coverage). If the target node where the UE is resuming has a set of candidates for CA and/or DC for the incoming UE and any of these support contention-free random access or are not overloaded in the uplink (so that contention-free Random Access Channel (RACH) resources could be provided for all possibly beams/SSBs/CSI-RS candidates), the target node does not benefit much from beam measurement information. Hence, despite the possible availability, the target node may request the UE to only include cell measurement information, or in other words the target node may request the UE to exclude beam measurements.

Examples of Reporting Configurations

In another solution, the RRC Resume message may contain equivalent information that is in the connected mode reporting configuration such as number of beams to be included, whether best neighbors in serving cells are included, which quantities, etc. Some of these that may be included are reproduced below:

| ReportConfigNR information element | |
|---|---|
| -- ASN1START | |
| -- TAG-REPORTCONFIGNR-START | |
| ReportConfigNR ::= | SEQUENCE { |
|   reportType | CHOICE { |
|     periodical | |
| PeriodicalReportConfig, | |
|     eventTriggered | |
| EventTriggerConfig, | |
|     ..., | |
|     reportCGI | ReportCGI |
|   } | |
| } | |
| ReportCGI ::= | SEQUENCE { |
|   cellForWhichToReportCGI | PhysCellId, |
|   ... | |
| } | |
| EventTriggerConfig::= | SEQUENCE { |
|   eventId | CHOICE { |
|     eventA1 | SEQUENCE { |
|       a1-Threshold | |
| MeasTriggerQuantity, | |
|       reportOnLeave | BOOLEAN, |
|       hysteresis | |
| Hysteresis, | |
|       timeToTrigger | |
| TimeToTrigger | |
|     }, | |
|     eventA2 | SEQUENCE { |
|       a2-Threshold | |
| MeasTriggerQuantity, | |
|       reportOnLeave | BOOLEAN, |
|       hysteresis | |
| Hysteresis, | |
|       timeToTrigger | |
| TimeToTrigger | |
|     }, | |
|     eventA3 | SEQUENCE { |
|       a3-Offset | |
| MeasTriggerQuantityOffset, | |
|       reportOnLeave | BOOLEAN, |
|       hysteresis | |
| Hysteresis, | |
|       timeToTrigger | |
| TimeToTrigger, | |
|       useWhiteCellList | BOOLEAN |
|     }, | |
|     eventA4 | SEQUENCE { |
|       a4-Threshold | |
| MeasTriggerQuantity, | |
|       reportOnLeave | BOOLEAN, |
|       hysteresis | |
| Hysteresis, | |
|       timeToTrigger | |
| TimeToTrigger, | |
|       useWhiteCellList | BOOLEAN |
|     }, | |
|     eventA5 | SEQUENCE { |
|       a5-Threshold1 | |
| MeasTriggerQuantity, | |
|       a5-Threshold2 | |
| MeasTriggerQuantity, | |
|       reportOnLeave | BOOLEAN, |
|       hysteresis | |
| Hysteresis, | |
|       timeToTrigger | |
| TimeToTrigger, | |
|       useWhiteCellList | BOOLEAN |
|     }, | |
|     eventA6 | SEQUENCE { |
|       a6-Offset | |
| MeasTriggerQuantityOffset, | |
|       reportOnLeave | BOOLEAN, |
|       hysteresis | |
| Hysteresis, | |
|       timeToTrigger | |
| TimeToTrigger, | |
|       useWhiteCellList | BOOLEAN |
|     }, | |
|     ... | |

-continued

| ReportConfigNR information element | |
|---|---|
|   }. | |
|   rsType | NR-RS-Type, |
|   reportInterval | ReportInterval, |
|   reportAmount | ENUMERATED {r1, r2, r4, r8, r16, r32, r64, infinity}, |
|   reportQuantityCell | |
| MeasReportQuantity, | |
|   maxReportCells | INTEGER |
| (1..maxCellReport), | |
|   reportQuantityRS-Indexes | |
| MeasReportQuantity | |
| OPTIONAL,  -- Need R | |
|   maxNrofRS-IndexesToReport | INTEGER |
| (1..maxNrofIndexesToReport) | OPTIONAL, |
| -- Need R | |
|   includeBeamMeasurements | BOOLEAN, |
|   reportAddNeighMeas | ENUMERATED |
| {setup} | OPTIONAL, - |
| - Need R | |
|   ... | |
| } | |
| PeriodicalReportConfig ::= | SEQUENCE { |
|   rsType | NR-RS-Type, |
|   reportInterval | ReportInterval, |
|   reportAmount | ENUMERATED {r1, r2, r4, r8, r16, r32, r64, infinity}, |
|   reportQuantityCell | |
| MeasReportQuantity, | |
|   maxReportCells | INTEGER |
| (1..maxCellReport), | |
|   reportQuantityRS-Indexes | |
| MeasReportQuantity | |
| OPTIONAL,  -- Need R | |
|   maxNrofRS-IndexesToReport | INTEGER |
| (1..maxNrofIndexesToReport) | OPTIONAL, |
| -- Need R | |
|   includeBeamMeasurements | BOOLEAN, |
|   useWhiteCellList | BOOLEAN, |
|   ... | |
| } | |
| NR-RS-Type ::= | ENUMERATED {ssb, csi-rs} |
| MeasTriggerQuantity ::= | CHOICE { |
|   rsrp | RSRP-Range, |
|   rsrq | RSRQ-Range, |
|   sinr | SINR-Range |
| } | |
| MeasTriggerQuantityOffset ::= | CHOICE { |
|   rsrp | INTEGER (-30..30), |
|   rsrq | INTEGER (-30..30), |
|   sinr | INTEGER (-30..30) |
| } | |
| MeasReportQuantity ::= | SEQUENCE { |
|   rsrp | BOOLEAN, |
|   rsrq | BOOLEAN, |
|   sinr | BOOLEAN |
| } | |
| -- TAG-REPORTCONFIGNR-STOP | |
| -- ASN1STOP | |

As in the case of Msg3 and Msg5 based solutions, the target network node can indicate via SIB broadcasting what information that it wants the UE to report or not report (i.e., the UEInformationRequestcould just include the flag to report or not, while the details of what to report or not is broadcasted in the SIB).

Additional Aspects

Figure 13:
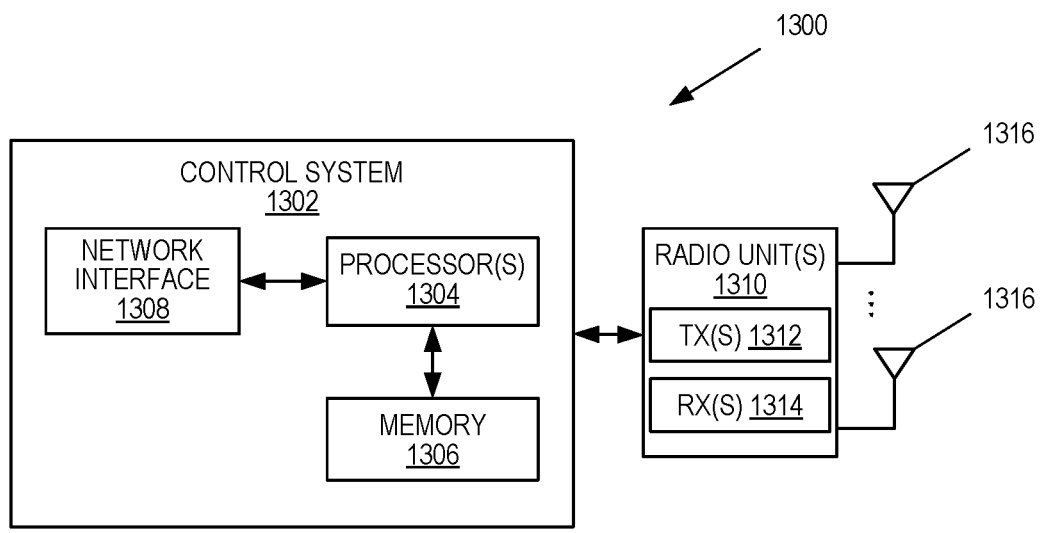
FIGS. 13 through 15 are schematic block diagrams of example embodiments of a network node.

FIG. 13 is a schematic block diagram of a radio access node 1300 according to some embodiments of the present disclosure. The radio access node 1300 may be, for example, a base station 802 or 806. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein (e.g., one or more functions of a network node as described above, e.g., with respect to FIG. 11). In some embodiments, the function(s) are implemented in software that is stored, e.g., in the memory 1306 and executed by the one or more processors 1304.

Figure 14:
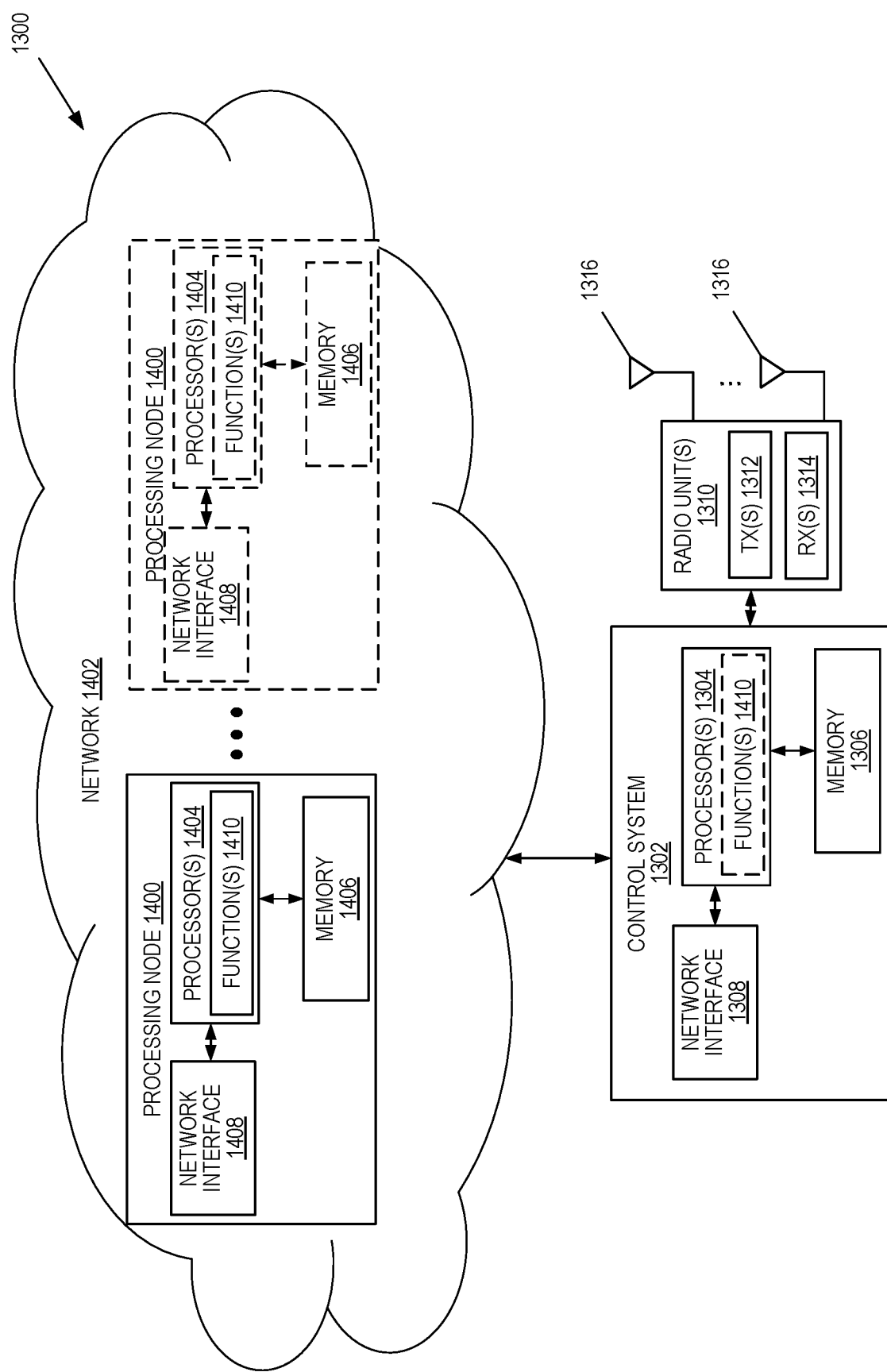

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein (e.g., one or more functions of a network node as described above, e.g., with respect to FIG. 11) are implemented at the one or more processing nodes 1400 or distributed across the control system 1302 and the one or more processing nodes 1400 in any desired manner. In some particular embodiments, some or all of the functions 1410 of the radio access node 1300 described herein (e.g., one or more functions of a network node as described above, e.g., with respect to FIG. 11) are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
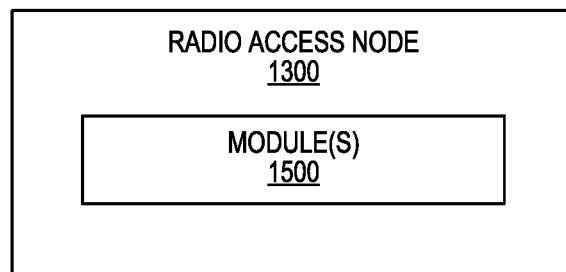

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein (e.g., one or more functions of a network node as described above, e.g., with respect to FIG. 11). This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
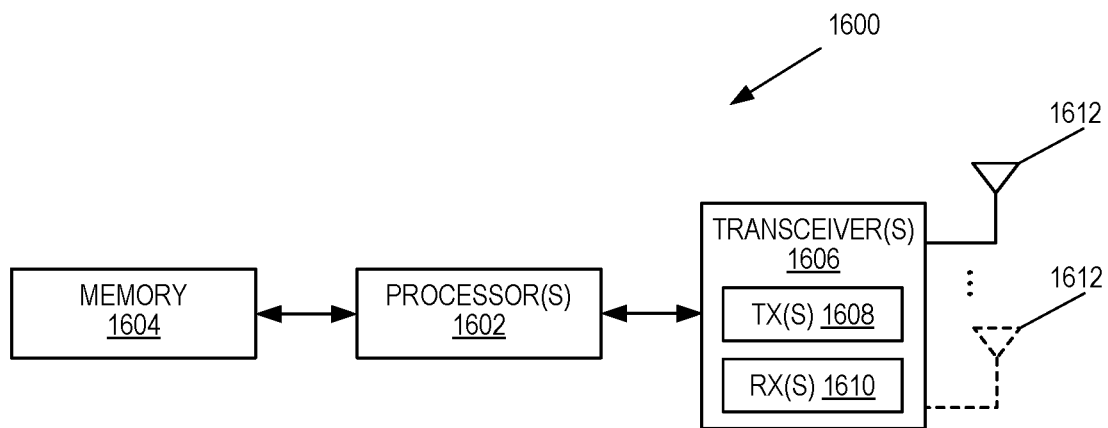
FIGS. 16 and 17 are schematic block diagrams of example embodiments of a wireless device.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio-front end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above (e.g., one or more functions of a UE or wireless device/terminal as described above, e.g., with respect to FIG. 9) may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
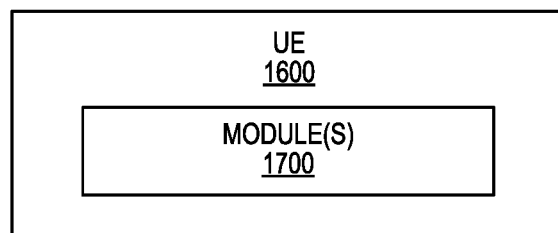

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein (e.g., one or more functions of a UE or wireless device/ terminal as described above, e.g., with respect to FIG. 9).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a wireless device for early reporting of dormant mode measurements to a cellular communications network, the method comprising: determining (906) a subset of dormant mode measurements to be reported by the wireless device; and performing (908) early reporting of the determined subset of the dormant mode measurements upon resuming a connection to the cellular communications network.

Embodiment 2: The method of embodiment 1 wherein the subset of the dormant mode measurements is a subset of dormant mode measurements performed by the wireless device while in an idle or inactive state that satisfy one or more criteria.

Embodiment 3: The method of embodiment 1 wherein the subset of the dormant mode measurements is a subset of dormant mode measurements performed by the wireless device while in an idle or inactive state that are associated with one or more particular cells and/or one or more particular beams.

Embodiment 4: The method of embodiment 1 wherein the subset of the dormant mode measurements is a subset of dormant mode measurements performed by the wireless device while in an idle or inactive state that are associated with one or more particular frequencies.

Embodiment 5: The method of embodiment 1 wherein the subset of the dormant mode measurements is a subset of dormant mode measurements performed by the wireless device while in an idle or inactive state that are associated with one or more particular RATs.

Embodiment 6: The method of embodiment 1 wherein the subset of the dormant mode measurements is a subset of dormant mode measurements performed by the wireless device while in an idle or inactive state that are associated with one or more particular measurement quantities per cell.

Embodiment 7: The method of embodiment 1 wherein the subset of the dormant mode measurements is a subset of dormant mode measurements performed by the wireless device while in an idle or inactive state that are associated with one or more particular measurement quantities per beam.

Embodiment 8: The method of embodiment 1 wherein the subset of the dormant mode measurements is a subset of dormant mode measurements performed by the wireless device while in an idle or inactive state that are associated with one or more particular reference signal types.

Embodiment 9: The method of any one of embodiments 1 to 8 wherein determining the subset of the dormant mode measurements to be reported by the wireless device comprises receiving a configuration of the subset of the dormant mode measurements from a network node.

Embodiment 10: The method of embodiment 9 wherein the configuration is received via a message.

Embodiment 11: The method of embodiment 10 wherein the message is a UEInformationRequest.

Embodiment 12: The method of embodiment 10 wherein the message is an RRCResume.

Embodiment 13: The method of embodiment 10 wherein the message is a RAR.

Embodiment 14: The method of embodiment 10 wherein performing early reporting of the subset of the dormant mode measurements comprises reporting the subset of the dormant mode measurements via a response to the message.

Embodiment 15: The method of embodiment 14 wherein the message is a UEInformationRequest, and the response is a UEInformationResponse.

Embodiment 16: The method of embodiment 14 wherein the message is an RRCResume, and the response is an RRCResumeComplete.

Embodiment 17: The method of embodiment 14 wherein the message is a RAR, and the response is a response to the RAR message.

Embodiment 18: The method of any one of embodiments 1 to 17 further comprising performing (910) one or more actions to handle any dormant mode measurements that are not reported in the subset.

Embodiment 19: A method performed by a base station comprising: providing (W202), to a wireless device, information that indicates a subset of dormant mode measurements to be reported by the wireless device via early measurement reporting.

Embodiment 20: The method of embodiment 19 further comprising receiving the subset of the dormant mode measurements from the wireless device upon in association with a connection resume procedure.

Embodiment 21: The method of embodiment 19 or 20 wherein the subset of the dormant mode measurements is a subset of dormant mode measurements performed by the wireless device while in an idle or inactive state that satisfy one or more criteria.

Embodiment 22: The method of embodiment 19 or 20 wherein the subset of the dormant mode measurements is a subset of dormant mode measurements performed by the wireless device while in an idle or inactive state that are associated with one or more particular cells and/or one or more particular beams.

Embodiment 23: The method of embodiment 19 or 20 wherein the subset of the dormant mode measurements is a subset of dormant mode measurements performed by the wireless device while in an idle or inactive state that are associated with one or more particular frequencies.

Embodiment 24: The method of embodiment 19 or 20 wherein the subset of the dormant mode measurements is a subset of dormant mode measurements performed by the wireless device while in an idle or inactive state that are associated with one or more particular RATs.

Embodiment 25: The method of embodiment 19 or 20 wherein the subset of the dormant mode measurements is a subset of dormant mode measurements performed by the wireless device while in an idle or inactive state that are associated with one or more particular measurement quantities per cell.

Embodiment 26: The method of embodiment 19 or 20 wherein the subset of the dormant mode measurements is a subset of dormant mode measurements performed by the wireless device while in an idle or inactive state that are associated with one or more particular measurement quantities per beam.

Embodiment 27: The method of embodiment 19 or 20 wherein the subset of the dormant mode measurements is a subset of dormant mode measurements performed by the wireless device while in an idle or inactive state that are associated with one or more particular reference signal types.

Embodiment 28: The method of any one of embodiments 19 to 27 wherein providing the information comprises providing the information in a UEInformationRequest Embodiment 29: The method of any one of embodiments 19 to 27 wherein providing the information comprises providing the information in an RRCResume.

Embodiment 30: The method of any one of embodiments 19 to 27 wherein providing the information comprises providing the information in a RAR.

Embodiment 31: A wireless device comprising: processing circuitry configured to perform any of the steps of any of embodiments 1 to 18; and power supply circuitry configured to supply power to the wireless device.

Embodiment 32: A base station comprising: processing circuitry configured to perform any of the steps of any of embodiments 19 to 30; and power supply circuitry configured to supply power to the base station.

Embodiment 33: A User Equipment, UE, comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of embodiments 1 to 18; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

At least some of the following abbreviations may be used in this disclosure. If there is an inconsistency between abbreviations, preference should be given to how it is used above. If listed multiple times below, the first listing should be preferred over any subsequent listing(s).

| | |
|---|---|
| 3GPP | Third Generation Partnership Project |
| 5G | Fifth Generation |
| 5GC | Fifth Generation Core |
| 5GS | Fifth Generation System |
| AMF | Access and Mobility Function |
| AS | Access Stratum |
| ASIC | Application Specific Integrated Circuit |
| AUSF | Authentication Server Function |
| BWP | Bandwidth Part |
| CA | Carrier Aggregation |
| CCCH | Common Control Channel |
| CE | Control Element |
| CGI | Cell Global Identifier |
| CPU | Central Processing Unit |
| CSI-RS | Channel State Information Reference Signal |
| DC | Dual Connectivity |
| DSP | Digital Signal Processor |
| eLTE | Enhanced Long Term Evolution |
| eNB | Enhanced or Evolved Node B |
| EN-DC | Evolved Universal Terrestrial Radio Access Network New Radio Dual Connectivity |
| EPC | Evolved Packet Core |
| euCA | Enhancing Utilization of Carrier Aggregation |
| E-UTRA | Evolved Universal Terrestrial Radio Access |
| E-UTRAN | Evolved Universal Terrestrial Radio Access Network |
| FPGA | Field Programmable Gate Array |
| gNB | New Radio Base Station |
| HSS | Home Subscriber Server |
| ID | Identity |
| LTE | Long Term Evolution |
| MAC | Medium Access Control |
| MCG | Master Cell Group |
| MeNB | Master Enhanced or Evolved Node B |
| MME | Mobility Management Entity |
| MR-DC | Multi-Radio Dual Connectivity |
| ms | Millisecond |
| MTC | Machine Type Communication |
| NE | New Radio Evolved Universal Terrestrial Radio Access |
| NEF | Network Exposure Function |
| NG-DC | Next Generation Dual Connectivity |
| ng-eNB | Next Generation Enhanced or Evolved Node B |
| NG-RAN | Next Generation Radio Access Network |
| NR | New Radio |
| NRF | Network Function Repository Function |
| NSSF | Network Slice Selection Function |
| PCell | Primary Cell |
| PCF | Policy Control Function |
| PCI | Physical Cell Identity |
| P-GW | Packet Data Network Gateway |
| PRACH | Physical Random Access Channel |
| PSCell | Primary Secondary Cell |
| RACH | Random Access Channel |
| RAM | Random Access Memory |
| RAN | Radio Access Network |
| RAR | Random Access Response |
| RAT | Radio Access Technology |
| ROM | Read Only Memory |
| RRC | Radio Resource Control |
| RRH | Remote Radio Head |
| RRM | Radio Resource Management |
| RSRP | Reference Signal Received Power |
| RSRQ | Reference Signal Received Quality |
| SA | Stand-Alone |
| SCEF | Service Capability Exposure Function |
| SCell | Secondary Cell |
| SCG | Secondary Cell Group |
| SDU | Service Data Unit |
| SIB | System Information Block |
| SINR | Signal to Interference plus Noise Ratio |
| SMF | Session Management Function |
| SSB | Synchronization Signal Block |
| TS | Technical Specification |
| UDM | Unified Data Management |
| UE | User Equipment |
| UPF | User Plane Function |

Those skilled in the art will recognize improvements and modifications to the embodiments of the present disclosure. All such improvements and modifications are considered within the scope of the concepts disclosed herein.

What is claimed is:

1. A method performed by a wireless device for reporting measurements to a cellular communications network, the method comprising:
performing measurements while in an idle or inactive state;
storing the measurements;
determining a subset of the measurements to be reported by the wireless device such that one or more of the measurements are selected to be in the determined subset of the measurements based on at least one of:
the one or more of the measurements being associated with one with one or more particular Radio Access Technologies (RATs); and
the one or more of the measurements being associated with one or more particular cells, wherein the one or more particular cells are determined by at least one of:
a list of cells;
a maximum number of cells;
cells on a serving frequency of the wireless device;
cells on a non-serving frequency of the wireless device; and
cells on a particular frequency; and
reporting the determined subset of the measurements to the cellular communications network.

2. The method of claim 1 wherein the subset of the measurements is further limited to one or more particular beam measurements performed by the wireless device while in the idle or inactive state for beams that are associated with the one or more particular cells, the one or more particular beam measurements being determined by:
(a) a maximum number of beams;
(b) beams that have a signal quality above a specific threshold; or
both (a) and (b).

3. The method of claim 1 wherein the subset of the measurements is further limited to measurements performed by the wireless device while in the idle or inactive state that are associated with one or more particular frequencies.

4. The method of claim 1 wherein the subset of the measurements is further limited to measurements performed by the wireless device while in the idle or inactive state that are associated with one or more particular measurement quantities per beam.

5. The method of claim 1 wherein determining the subset of the measurements to be reported by the wireless device comprises receiving a request for reporting the subset of the measurements from a network node.

6. The method of claim 5 wherein the request is received via a UEInformationRequest.

7. The method of claim 6 wherein reporting the determined subset of the measurements comprises reporting the determined subset of the measurements in a UEInformationResponse.

8. The method of claim 5 wherein the request is received via a Radio Resource Control (RRC) resume message.

9. The method of claim 8 wherein reporting the determined subset of the measurements comprises reporting the determined subset of the measurements in an RRC resume complete message.

10. The method of claim 5 wherein the request is received via a random access response.

11. The method of claim 10 wherein reporting the determined subset of the measurements comprises reporting the determined subset of the measurements in a Radio Resource Control (RRC) resume request or in a message that is multiplexed with the RRC resume request.

12. The method of claim 1 further comprising performing one or more actions to handle any measurements that are not reported in the subset of the measurements.

13. The method of claim 12 wherein the one or more actions comprise deleting at least some of the measurements that are not reported in the subset of the measurements.

14. The method of claim 12 wherein the one or more actions comprise keeping at least some of the measurements that are not reported in the subset of the measurements.

15. A wireless device for reporting measurements to a cellular communications network, the wireless device comprising:
one or more transmitters;
one or more receivers; and
processing circuitry associated with the one or more transmitters and the one or more receivers, the processing circuitry configured to cause the wireless device to:
perform measurements while in an idle or inactive state;
store the measurements;
determine a subset of the measurements to be reported by the wireless device such that one or more of the measurements are selected to be in the determined subset of the measurements based on at least one of:
the one or more of the measurements being associated with one with one or more particular Radio Access Technologies (RATs); and
the one or more of the measurements being associated with one or more particular cells, wherein the one or more particular cells are determined by at least one of:
a list of cells;
a maximum number of cells;
cells on a serving frequency of the wireless device;
cells on a non-serving frequency of the wireless device; and
cells on a particular frequency; and
report the determined subset of the measurements to the cellular communications network.

16. A method performed by a network node comprising:
providing, to a wireless device, information that indicates a subset of measurements to be reported by the wireless device, the measurements being measurements performed by the wireless device in an idle or inactive state wherein the information indicates that one or more of the measurements are to be selected to be in the subset of the measurements based on at least one of:
one or more of the measurements are associated with one with one or more particular Radio Access Technologies (RATs); and
the one or more of the measurements are associated with one or more particular cells, wherein the one or more particular cells are determined by at least one of:
a list of cells;
a maximum number of cells;
cells on a serving frequency of the wireless device;
cells on a non-serving frequency of the wireless device; and
cells on a particular frequency; and
receiving the subset of the measurements from the wireless device.

17. A network node for a cellular communications network, the network node comprising:

processing circuitry configured to cause the network node to:

provide, to a wireless device, information that indicates a subset of measurements to be reported by the wireless device, the measurements being measurements performed by the wireless device in an idle or inactive state wherein the information indicates that one or more of the measurements are to be selected to be in the subset of the measurements based on at least one of:

one or more of the measurements are associated with one with one or more particular Radio Access Technologies (RATs); and the one or more of the measurements are associated with one or more particular cells, wherein the one or more particular cells are determined by at least one of:
- a list of cells;
- a maximum number of cells;
- cells on a serving frequency of the wireless device;
- cells on a non-serving frequency of the wireless device; and
- cells on a particular frequency; and receive the subset of the measurements from the wireless device.

* * * * *